(12) United States Patent
Watanabe et al.

(10) Patent No.: US 7,804,505 B2
(45) Date of Patent: Sep. 28, 2010

(54) INFORMATION PROCESSING APPARATUS AND ASSOCIATED METHOD OF PRIORITIZING CONTENT FOR PLAYBACK

(75) Inventors: Kohki Watanabe, Kanagawa (JP); Tatsuya Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 11/206,057

(22) Filed: Aug. 18, 2005

(65) Prior Publication Data

US 2006/0045475 A1 Mar. 2, 2006

(30) Foreign Application Priority Data

Aug. 24, 2004 (JP) ............................ P2004-243553

(51) Int. Cl.
*G09G 5/36* (2006.01)
*G06T 11/40* (2006.01)

(52) U.S. Cl. ....................................... 345/547; 345/552

(58) Field of Classification Search ................. 345/327, 345/547, 302, 328, 352, 357, 552; 348/7, 348/10, 12; 395/200.47–200.49; 386/69, 386/70; 375/240.01; 707/102; 725/139
See application file for complete search history.

(56) References Cited

U.S. PATENT DOCUMENTS

| | | | |
|---|---|---|---|
| 4,979,050 A | | 12/1990 | Westland et al. |
| 5,818,439 A | * | 10/1998 | Nagasaka et al. ............. 725/87 |
| 5,974,218 A | | 10/1999 | Nagasaka et al. |
| 6,154,600 A | | 11/2000 | Newman et al. |
| 6,222,532 B1 | * | 4/2001 | Ceccarelli .................... 715/723 |
| 6,279,076 B1 | | 8/2001 | Shishido et al. |
| 6,573,907 B1 | | 6/2003 | Madrane |
| 6,891,546 B1 | * | 5/2005 | Park et al. .................... 345/552 |
| 7,293,280 B1 | * | 11/2007 | Gupta et al. ................ 725/139 |
| 2003/0080963 A1 | * | 5/2003 | Van Hook et al. ........... 345/501 |
| 2003/0170011 A1 | * | 9/2003 | Otsuka et al. ............... 386/125 |
| 2004/0128308 A1 | * | 7/2004 | Obrador ..................... 707/102 |
| 2005/0235317 A1 | * | 10/2005 | Green ......................... 725/46 |

FOREIGN PATENT DOCUMENTS

| | | |
|---|---|---|
| JP | 2000-209529 | 7/2000 |
| JP | 2003-101969 | 4/2003 |
| WO | WO 98/34181 | 8/1998 |
| WO | WO 01/13277 A2 | 2/2001 |
| WO | WO 02/065299 A1 | 8/2002 |
| WO | WO 03/052760 A1 | 6/2003 |

OTHER PUBLICATIONS

Patent Abstracts of Japan, JP 2003-006213, Jan. 10, 2003.

* cited by examiner

*Primary Examiner*—Amare Mengistu
*Assistant Examiner*—Aaron M Guertin
(74) *Attorney, Agent, or Firm*—Oblon, Spivak, McClelland, Maier & Neustadt, L.L.P.

(57) ABSTRACT

A cache control unit of a video data playback control apparatus sets priority video data in order to efficiently use a storage area of a cache memory. The priority video data includes video data which includes a greater number of portions of video data than that of data displayed in a display unit, which includes a smaller number of portions of video data than a maximum number that can be held in the cache memory, and which has a high possibility of being output from the cache memory to the display unit. Also, the cache control unit preferentially reads the priority video data from a recording medium and stores it in the cache memory.

10 Claims, 29 Drawing Sheets

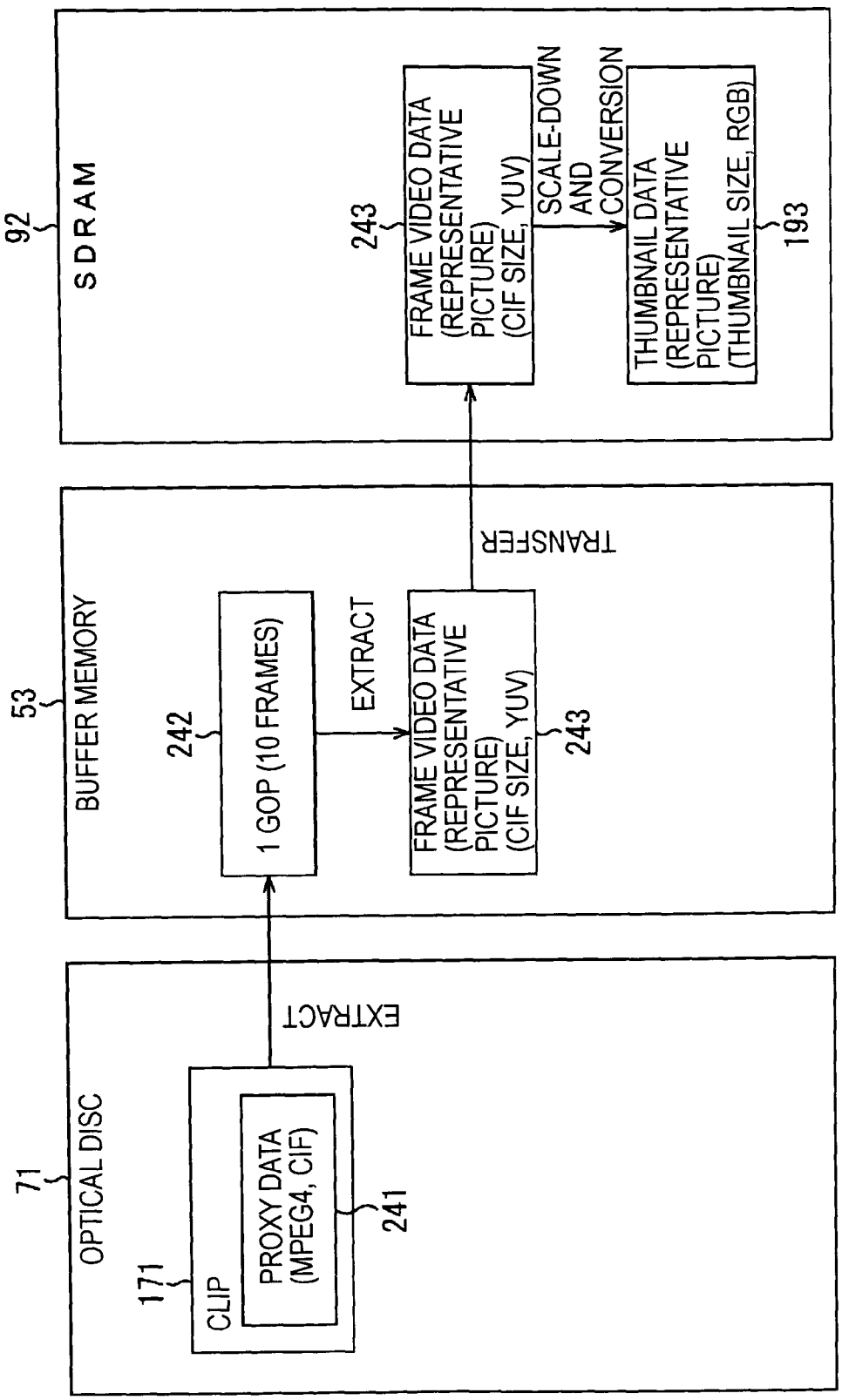

INFORMATION PROCESSING APPARATUS AND ASSOCIATED METHOD OF PRIORITIZING CONTENT FOR PLAYBACK

BACKGROUND OF THE INVENTION

The present invention relates to an information processing apparatus and associated method of editing content. More particularly, the present invention relates to an information processing apparatus, an information processing method, and a computer-implemented process for facilitating editing or production functions.

A playback apparatus configured to reproduce multimedia content of a recording medium, such as an optical disc, has been known. Such a playback apparatus displays an index of thumbnails (scaled-down images) corresponding to respective portion of video data recorded on a recording medium. These thumbnails are typically displayed on a monitor so that a user can easily select a desired portion of video data from among a plurality of portions of video data recorded on the recording medium. After the user selects a desired thumbnail from the index of thumbnails displayed on the monitor, the playback apparatus reproduces video data corresponding to the selected thumbnail from the recording medium so as to play back and display the video data.

For example, when the video data used herein is compressed by an MPEG (Moving Picture Experts Group) method or the like, a drive of the playback apparatus reads a predetermined unit of respective portions of video data that is recorded on a recording medium loaded on the drive, for example, reads 1 GOP (group of pictures), which corresponds to about 10 frames. Then, a playback unit of the playback apparatus decodes the video data portion read. Then, the playback apparatus transfers the extracted frame video data to a video processing unit. The playback apparatus processes the frame video data in the video processing unit to reduce a picture size, so that a thumbnail (thumbnail data) is generated. Then, the playback apparatus displays an index of thumbnails corresponding to the respective portions of video data generated in the above-described manner on a monitor.

If the portions of video data recorded on the recording medium are so numerous that all thumbnails cannot be displayed on the monitor at one time (on one screen), the playback apparatus allows the monitor to display only a page of the index of the thumbnails (thumbnails that can be displayed on one screen) and changes pages to be displayed in response to instructions from a user. That is, in this case, the playback apparatus performs the above-described processes including reading, decoding, extraction of frame video data, transfer, and change of a size on each portion of video data in order to display thumbnails, every time the user inputs instructions of changing pages to be displayed. Then, the playback apparatus generates an image to be displayed (an index of thumbnails) by using the generated thumbnails and displays the index on the monitor.

A method for managing a backup of video data by using such thumbnails is disclosed (Japanese Unexamined Patent Application Publication No. 2003-6213). In Patent Document 1, a personal computer (PC) 80 operated by a user obtains second file information recorded in a recording unit 986 of a server 90 to which video data is backed up. Then, the PC 80 compares the second file information with first file information recorded in a recording unit 886 of the PC 80. As a result of the comparison, if it is determined that a main image that has been newly recorded in the recording unit 986 of the server 90 is not recorded in the PC 80, the PC 80 requests a scaled-down image of the main image to the server 90. The server 90 creates a scaled-down image based on the main image in response to the request and supplies scaled-down image data to the PC 80. The PC 80 receives the supplied scaled-down image data and records it in the recording unit 886. In other words, the PC 80 obtains a scaled-down image of a main image from the server 90 and manages it if the PC 80 does not have the main image among portions of video data stored in the server 90. The server 90 creates a scaled-down image based on a main image every time the PC 80 requests it and supplies the image to the PC 80.

However, in the above-described method of displaying an index of thumbnails performed in the playback apparatus, the playback apparatus must create a thumbnail every time a new thumbnail is to be displayed on the monitor. Since this process involves complicated operations as described above, response time from input of instructions of changing thumbnails by the user until completion of the process is long. Accordingly, the user cannot easily select a desired portion of video data from among a plurality of portions of video data.

More specifically, when the user inputs instructions to change thumbnails to be displayed, the playback apparatus performs the above-described processes including: reading moving picture data; decoding the moving picture data; extracting frame video data; transferring the frame video data; converting an image size; and generating an output image, so as to create a screen of an index of thumbnails for display to the screen. This processing causes an undesirable delay in device operation.

This is the same for the above-described case of managing a backup of video data. That is, in Japanese Unexamined Patent Application Publication No. 2003-6213, the server 90 creates a scaled-down image based on a main image and supplies it every time the PC 80 requests video data. This involves the above-described complicated processes, so that response time from when the PC 80 requests a scaled-down image until when the server 90 supplies is poor. Therefore, the PC 80 (or a user of the PC 80) has to wait repeatedly until this processing completes.

On the other hand, thumbnail data may be prepared in advance. In such a case, however, the amount of data to be processed increases in accordance with the amount of thumbnail data. For example, when data is recorded on a recording medium, thumbnail data must be recorded in addition to necessary main video data in the recording medium, which increases an occupied recording area in the recording medium.

The present invention has been made in view of these circumstances and is directed to enabling a user to easily select a desired portion of video data from among a plurality of portions of video data without increasing an amount of data to be processed.

BRIEF SUMMARY OF THE INVENTION

An information processing apparatus for processing video data is provided. A video data memory is configured to hold the video data of the apparatus. A controller is configured to control the video data memory to allow the video data memory to preferentially hold priority video data. The priority video data includes video data, which currently outputs from the video data memory, and video data, which includes a greater number of video data reference marker images than that of the output video data.

It is to be understood that both the foregoing general description of the invention and the following detailed description are exemplary, but are not restrictive, of the invention.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings wherein:

FIG. 11 is a schematic view illustrating a procedure of generating thumbnail data;

DETAILED DESCRIPTION OF THE INVENTION

Figure 1:
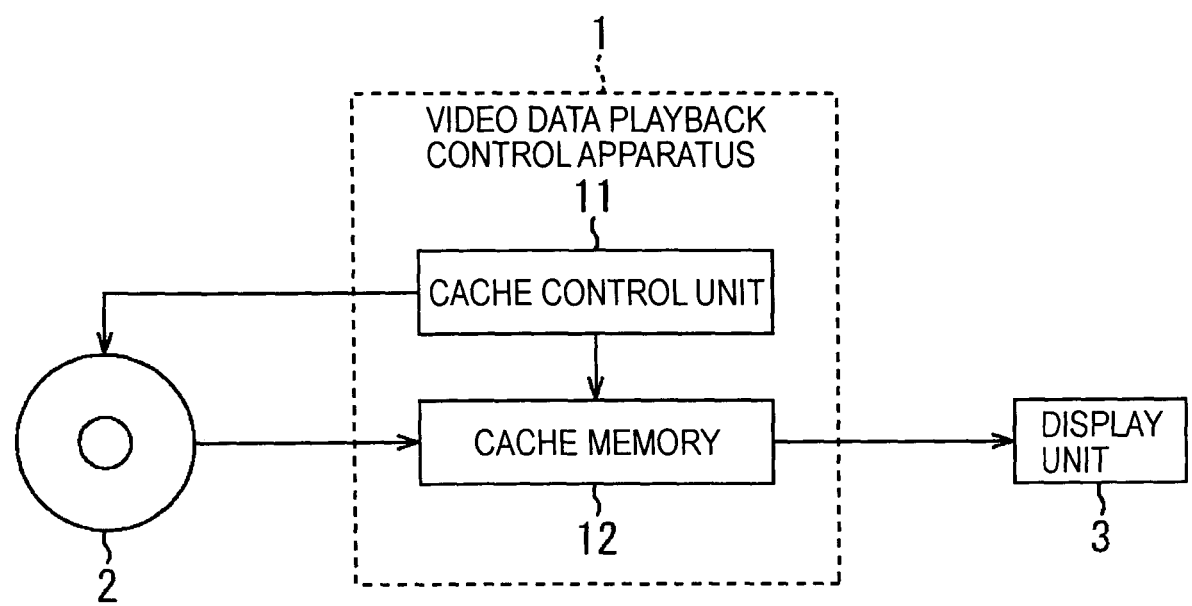
FIG. 1 is a block diagram showing an example of a configuration of a video data playback control apparatus to which an exemplary embodiment the present invention is applied.

FIG. 1 shows an example of a configuration of a video data playback control apparatus according to an exemplary embodiment of the present invention.

The video data playback control apparatus 1 reads video data recorded on a recording medium 2 and supplies it to a display unit 3, so as to display pictures corresponding to the video data. The video data playback control apparatus 1 includes a cache control unit 11 and a cache memory 12.

The recording medium 2 is a nonvolatile recording medium of a large capacity, for example, an optical disc such as a CD-ROM (compact disc-read only memory), a magneto-optical disc such as an MO (magneto-optical disc), a magnetic disk such as a hard disk, a magnetic tape, or a semiconductor memory such as a flash memory. The recording medium 2 records video data corresponding to pictures to be displayed on the display unit 3. The video data is read by the video data playback control apparatus 1.

The display unit 3 includes a display such as a CRT (cathode ray tube), plasma grid, or an LCD (liquid crystal display) and displays pictures corresponding to video data supplied from the video data playback control apparatus 1 on the display.

The cache control unit 11 is a processing unit controlling input/output of data to/from the cache memory 12. The cache control unit 11 reads video data recorded on the recording medium 2 and allows the cache memory 12 to hold (cache) it, and supplies video data held in the cache memory 12 to the display unit 3. The cache memory 12 includes a semiconductor memory such as an SDRAM (synchronous dynamic random access memory). Of course, those skilled in the art recognize that alternative memory technologies may perform the functionality described herein. The cache memory 12 is controlled by the cache control unit 11, holds video data supplied from the recording medium 2, and supplies the video data to the display unit 3 as necessary.

That is, the cache memory 12 includes a volatile storage area having a smaller capacity and a higher access speed than those of the recording medium 2. The exemplary recording medium 2 includes a nonvolatile storage area having a larger capacity and a lower access speed than those of the cache memory 12. The cache control unit 11 reads video data corresponding to pictures to be displayed by the display unit 3 in advance from the recording medium and allows the cache memory 12 to cache the video data.

Figure 2:
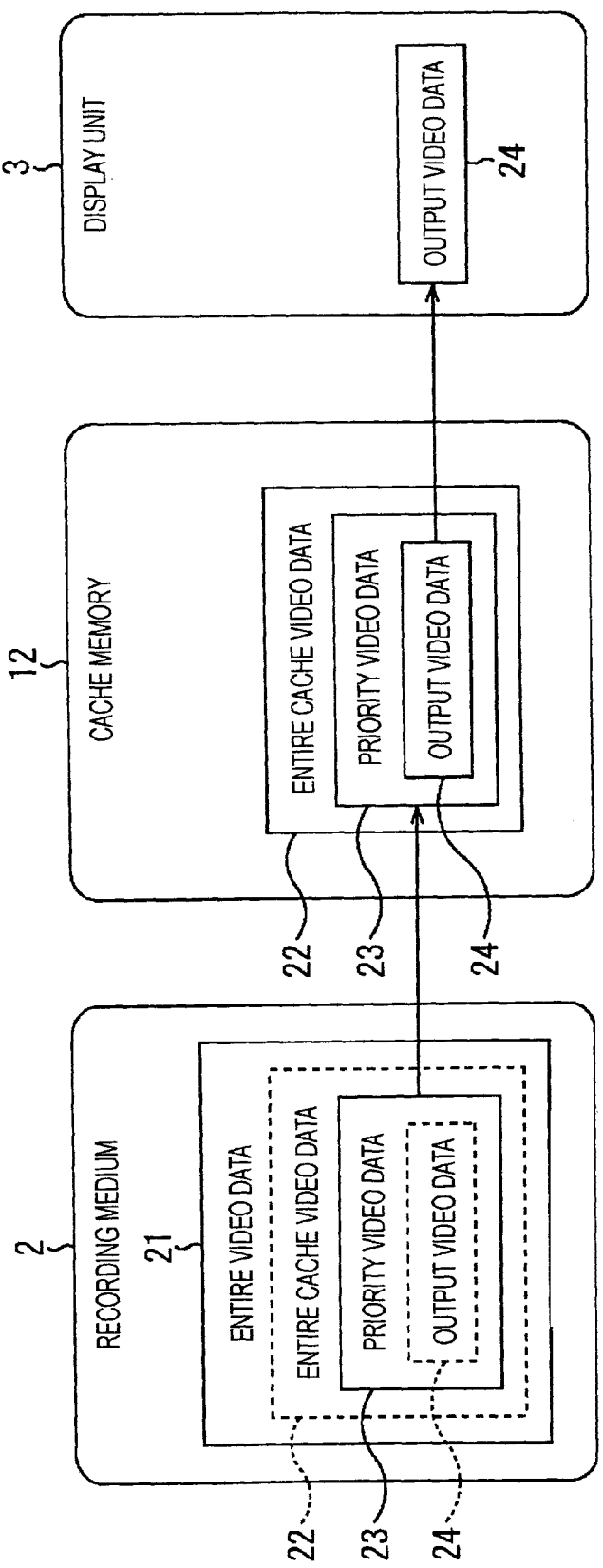
FIG. 2 illustrates a cache control method for video data in the video data playback control apparatus shown in FIG. 1.

As shown in FIG. 2, entire amount of video data 21 that can be recorded on the recording medium 2 is larger than an amount of entire cache video data 22 that can be recorded in the cache memory 12. In other words, the storage area of the cache memory 12 is limited with respect to the amount of the entire video data 21. Therefore, the cache control unit 11 sets video data that is likely to be output from the cache memory 12 to the display unit 3 as priority video data 23, and preferentially reads the priority video data 23 from the recording medium 2 and caches it in the cache memory 12 in order to efficiently use the storage area of the cache memory 12.

In other words, the cache control unit 11 sets output video data 24 to be supplied to the display unit 3, sets video data including the output video data 24 and having a smaller amount than that of the entire cache video data 22 as the priority video data 23, and preferentially caches the priority video data 23 in the cache memory 12. That is, even if the storage area of the cache memory 12 does not have a sufficient free space, the cache control unit 11 ensures a sufficient free space by erasing at least a required amount of video data in the cache memory 12 so that the priority video data 23 can be cached therein.

Figure 3:
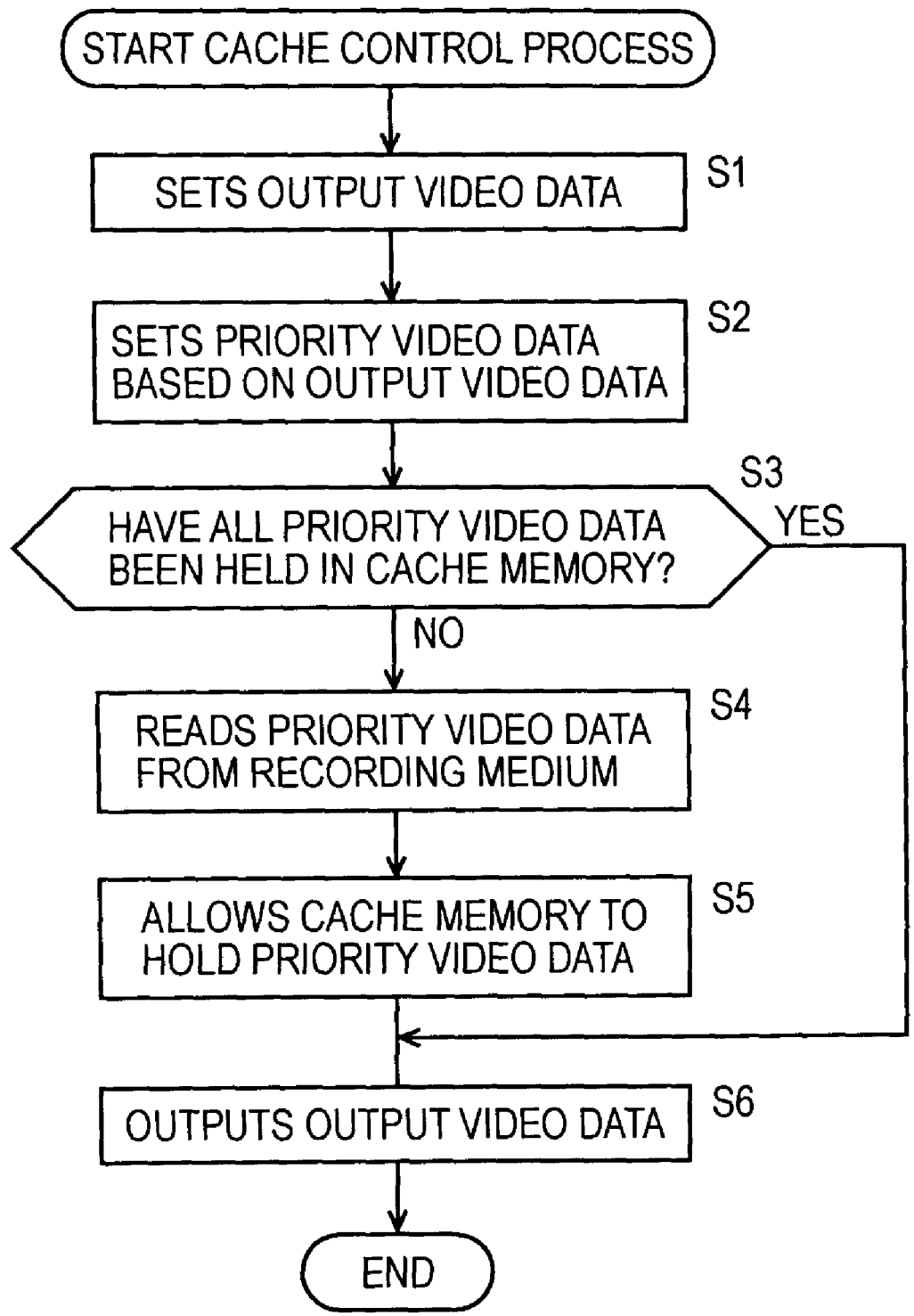
FIG. 3 is a flowchart illustrating an example of a cache control process executed by the video data playback control apparatus shown in FIG. 1.

A cache control process performed by the cache control unit 11 is described with reference to the flowchart shown in FIG. 3.

Any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

The cache control unit 11 starts the cache control process in order to supply video data to the display unit 3. After the cache control process starts, the cache control unit 11 specifies a portion of video data to be supplied to the display unit 3 and sets it as output video data 24 in step S1. The output video data 24 is an output unit of video data to be supplied from the cache memory 12 to the display unit 12, and the number of portions of the video data set as the output video data 24 may be plural. In step S2, the cache control unit 11 sets priority video data 23 based on the output video data 24 such that the priority video data 23 includes the output video data 24. As described above, the video data set as the priority video data 23 has a high possibility of being output to the display unit 3. The number of portions of the priority video data 23 is smaller than that of the entire cache video data 22, but includes the output video data 24.

After setting the priority video data 23, the cache control unit 11 determines in step S3 whether all priority video data 23 have been held in the cache memory 12. If they have not been held, the process proceeds to step S4, where the cache control unit 11 reads the priority video data 23 from the recording medium 2. Then, in step S5, the cache control unit 11 allows the cache memory 12 to hold the read priority video data 23 and the process proceeds to step S6.

When determining in step S3 that all priority video data 23 have been held in the cache memory 12, the cache control unit 11 skips steps S4 and S5 to jump to step S6.

In step S6, the cache control unit 11 reads the output video data 24 that was set in step S1 from the cache memory 12, outputs it to the display unit 3, and ends the cache control process.

In this way, the video data having a high possibility of being output to the display unit 3 is cached in the cache memory 12. This increases a hit rate when the cache control unit 11 searches the cache memory 12 for the output video data 24. In other words, a possibility that the video data playback control apparatus 1 caches video data to be supplied to the display unit 3 becomes higher, and thus the output video data 24 can be read from the cache memory 12, which has a higher access speed than the recording medium 2, and can be supplied to the display unit 3. Further, since only the video data that has been set as the priority video data 23 by the cache control unit 11 is read from the recording medium 2 and is cached in the cache memory 12, the video data playback control apparatus 1 can prevent unnecessary reading of video data from the recording medium 2. That is, the video data playback control apparatus 1 can supply video data to the display unit 3 at high speed without increasing a load of reading the video data, so that time required to display the output video data 24 in the display unit 3 can be shortened. As a result, a user can easily select a desired portion of video data by referring to pictures displayed in the display unit 3.

Figure 4:
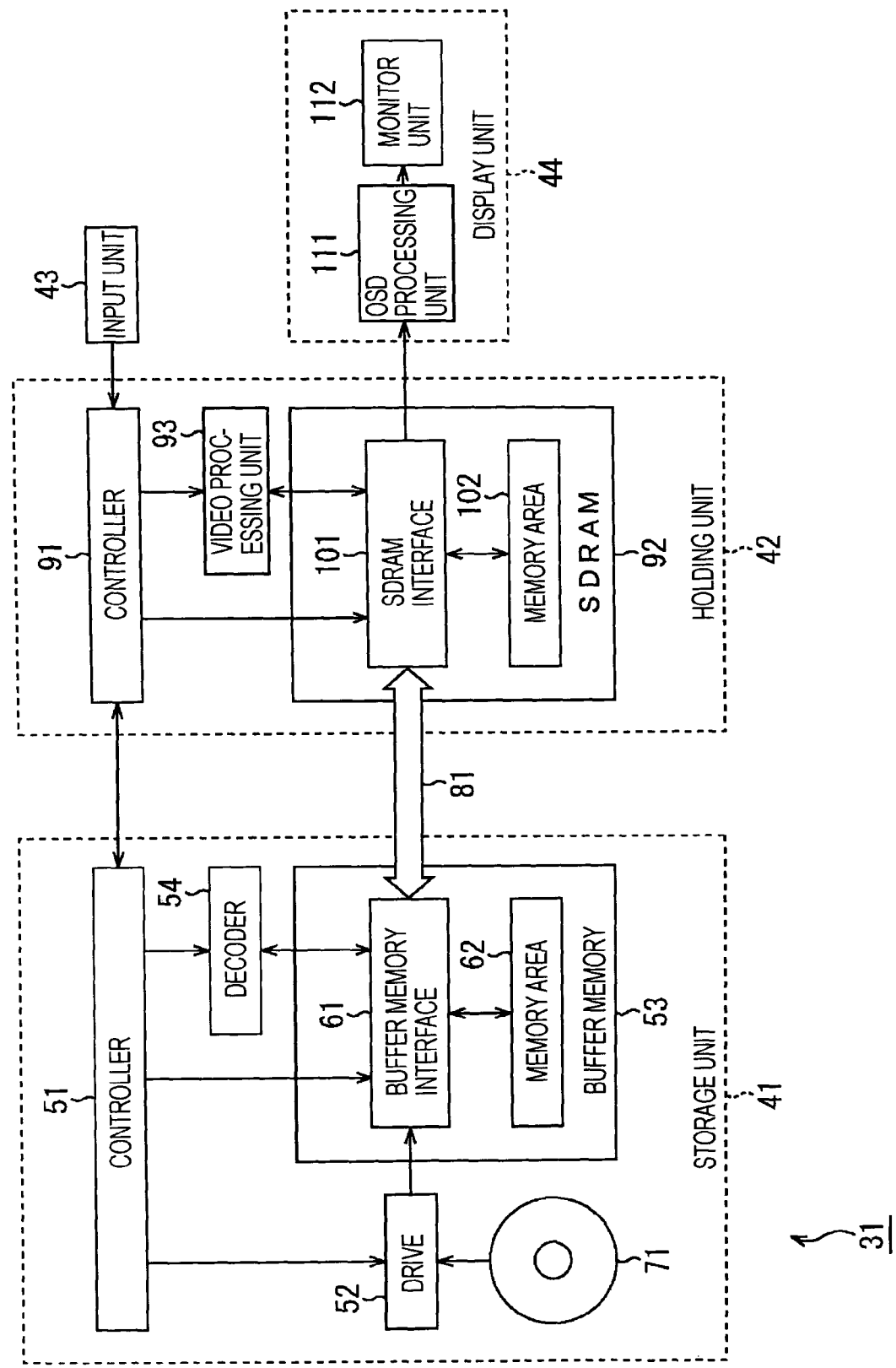
FIG. 4 is a block diagram showing an example of a configuration of an editor to which the present invention is applied.

Now, an exemplary embodiment of the above-described cache control is described. FIG. 4 is a block diagram showing an example of a configuration of an editor to which the present invention is applied.

In FIG. 4, the editor 31 is used for producing content, such as a movie or a television program, and nondestructively edits clip data including video and audio data.

In other words, the editor 31 reads and plays back clip data including video and audio data which is recorded on a recording medium and which is obtained by shooting (i.e., image capture), and creates an edit list as an edit result based on the clip data.

Herein, the clip data is a group of data including video and audio data obtained in one shooting (from start to end of shooting) and metadata added thereto. That is, in usual cases, content of a television program and the like is produced by combining portions of clip data in an editing operation. The edit list is information indicating content of an editing operation performed on the clip data and is equivalent to the edit result. The editor 31 creates the edit list based on the content of the editing operation performed on the clip data so as to obtain an edit result without editing original clip data (capable of performing nondestructive editing).

The editor 31 includes a storage unit 41, a holding unit 42, an input unit 43, and a display unit 44.

The storage unit 41 serves as a processing unit performing processing related to storage of clip data to be edited and includes a controller 51, a drive 52, a buffer memory 53, and a decoder 54.

The controller 51 serves as a control unit controlling the entire storage unit 41, transmits/receives control information to/from a controller 91 of the holding unit 42, and controls each of the drive 52, the buffer memory 53, and the decoder 54.

The drive 52 serves as an information read/write processing unit to which an optical disc 71 as a rewritable recording medium can be loaded, and reads/writes information from/to the optical disc 71 loaded thereto under control by the controller 51.

The buffer memory 53 is a semiconductor memory which temporarily holds information read from the optical disc 71 by the drive 52 until the information is transferred to the holding unit 42 and serves a storage area having a higher access speed and a smaller capacity than those of the optical disc 71. The buffer memory 53 includes a buffer memory interface 61 and a memory area 62. The buffer memory interface 61 serves as a processing unit performing interface processing for the memory area 62, and controls transmission/reception of information between the outside of the buffer memory 53 and the memory area 62 under control by the controller 51. Further, the buffer memory interface 61 connects to a PCI bus (peripheral components interconnect bus) 81 and communicates with the holding unit 42 through the PCI bus 81 under control by the controller 51. The memory area 62 is a storage area having a higher access speed and a smaller capacity than those of the optical disc 71, and holds data supplied from the buffer memory interface 61.

The decoder 54 serves as a processing unit performing a decoding process to decompress compressed data held in the buffer memory 53 under control by the controller 51.

The PCI bus 81 is a general-purpose bus and connects the buffer memory 53 of the storage unit 41 and an SDRAM 92 of the holding unit 42.

The holding unit 42 serves as a processing unit performing processing related to holding data read from the optical disc 71 and includes the controller 91, the SDRAM 92, and a video processing unit 93.

The controller 91 serves as a control unit controlling the entire holding unit 42, transmits/receives control information to/from the controller 51 of the storage unit 41, and controls the SDRAM 92 and the video processing unit 93.

The SDRAM 92 is a volatile semiconductor memory and is a storage area having a higher access speed and a smaller capacity than those of the optical disc 71. The SDRAM 92 includes an SDRAM interface 101 and a memory area 102. The SDRAM interface 101 serves as a processing unit performing an interface process for the memory area 102 and controls transmission/reception of information between the outside of the SDRAM 92 and the memory area 102 under control by the controller 91. Further, the SDRAM interface 101 connects to the PCI bus 81 and communicates with the storage unit 41 through the PCI bus 81 under control by the controller 91. The memory area 102 is a storage area having a higher access speed and a smaller capacity than those of the optical disc 71 and holds data supplied from the SDRAM interface 101.

The video processing unit 93 processes video data of clip data held in the SDRAM 92 and changes a picture size or performs data conversion as described below.

The input unit 43 serves as a user interface including a button or a switch to receive information input by the user and supply the information to the controller 91.

The display unit 44 serves as a processing unit performing processing related to display of clip data (including display of video data and output of audio data) and includes an OSD (on screen display) processing unit 111 and a monitor unit 112.

The OSD processing unit 111 generates pictures to be displayed on the monitor unit 112 by combining video data supplied from the holding unit 42 with GUI (graphical user interface) video data, and supplies the generated video data to the monitor unit 112. The monitor unit 112 includes a display such as an LCD or a CRT and performs processing related to display of pictures corresponding to video data supplied from the OSD processing unit 111.

Figure 5:
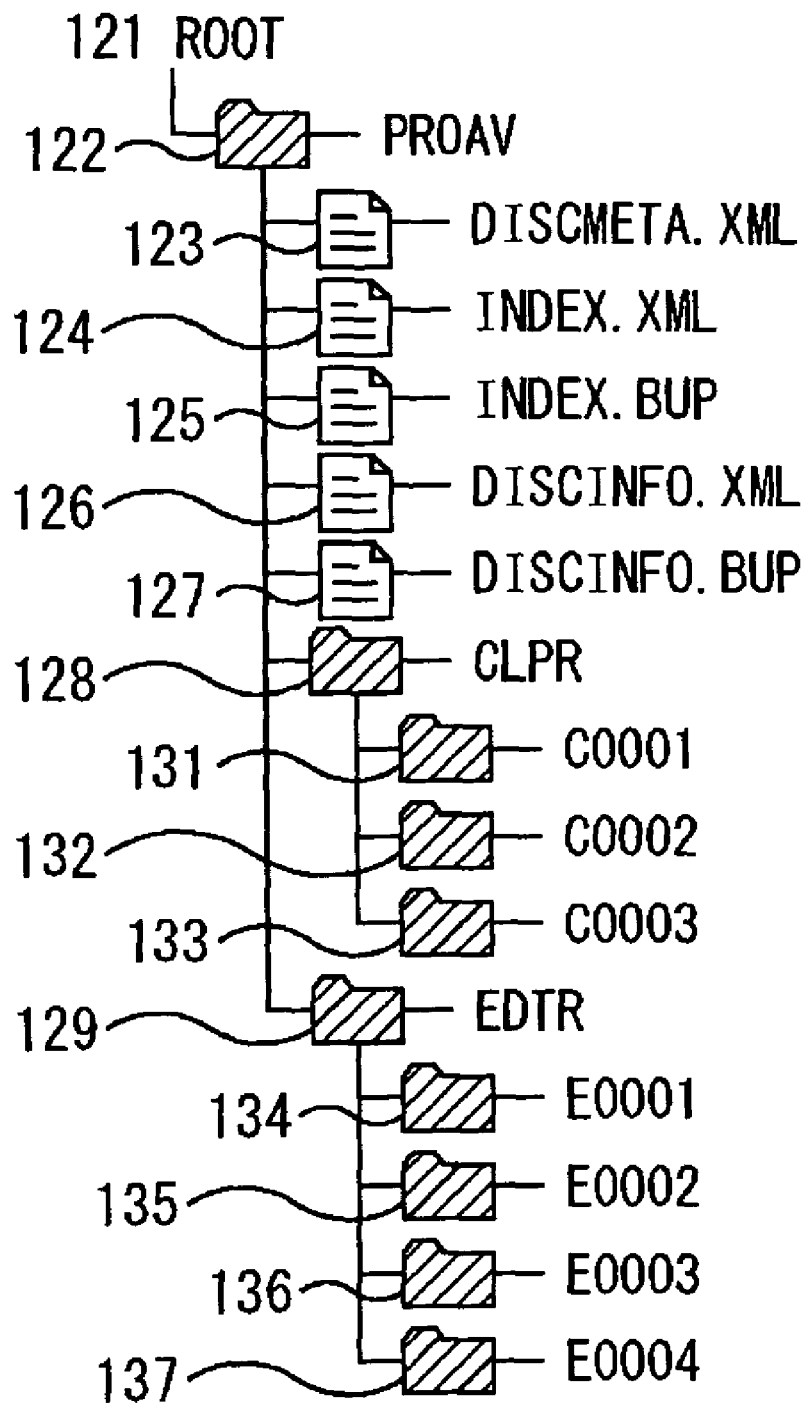
FIG. 5 shows an example of a directory structure in an optical disc shown in FIG. 4.
Figure 6:
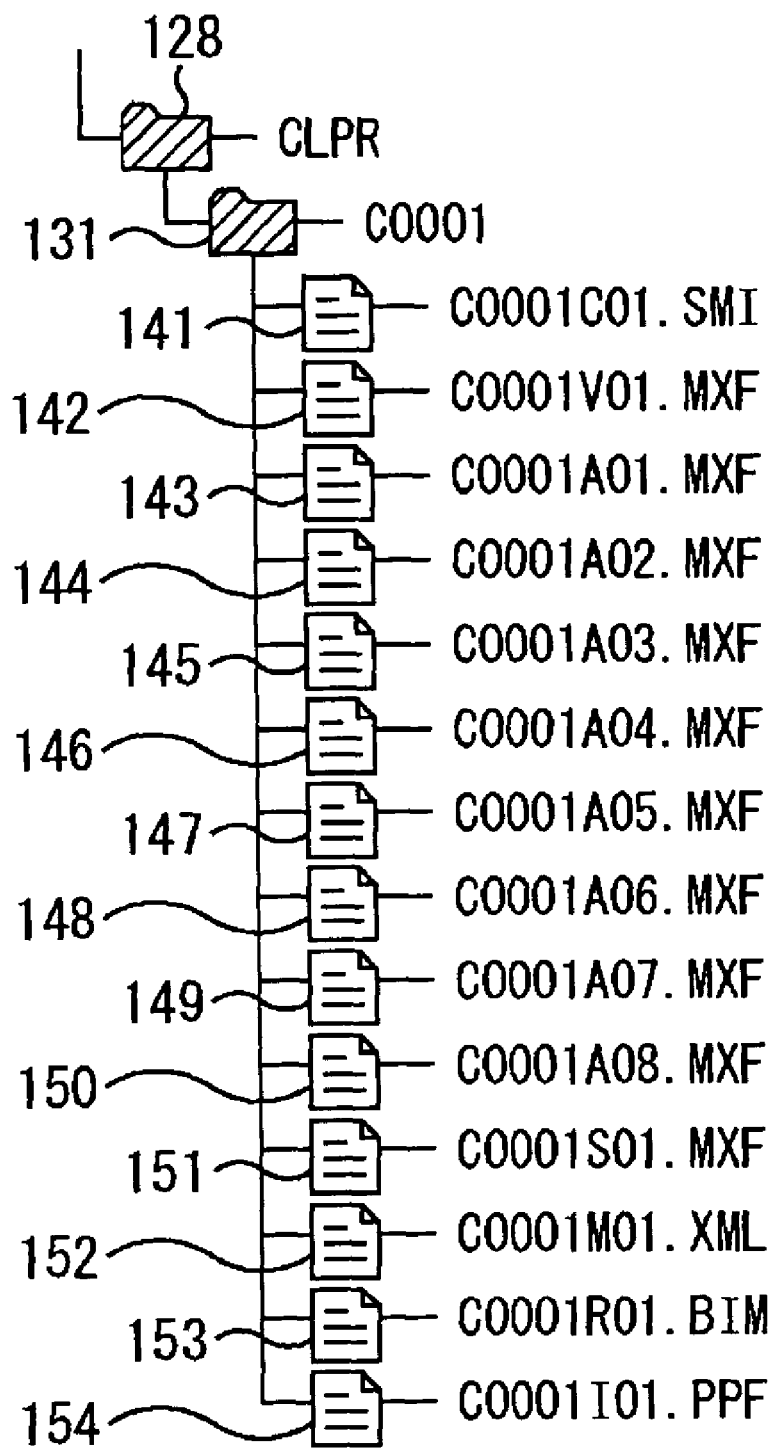
FIG. 6 shows a more specific example of the directory structure shown in FIG. 5.
Figure 7:
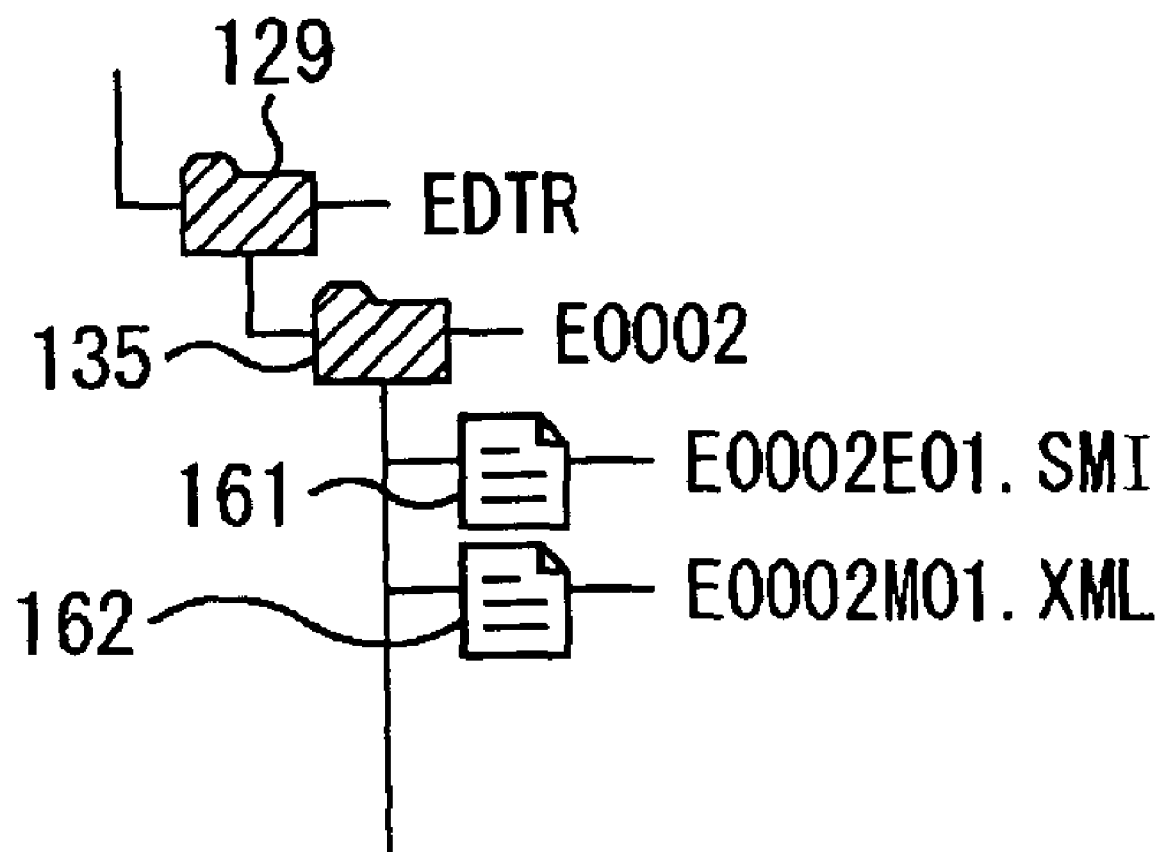
FIG. 7 shows a more specific example of the directory structure shown in FIG. 5.

Information shown in FIGS. 5 to 7 is recorded on the optical disc 71 in accordance with its format.

Data recorded on the optical disc 71 is managed by a file system, such as an UDF (universal disk format). The file system is not limited to the UDF, but any type of file system may be used as long as the editor 31 is adaptable thereto, for example, ISO9660 (international organization for standardization 9660). When a magnetic disk such as a hard disk is used instead of the optical disc 71, FAT (file allocation tables), NTFS (new technology file system), HFS (hierarchical file system), UFS (Unix® system), or the like may be used as the file system. Also, a dedicated file system may be used.

In FIG. 5, a root directory (ROOT) 121 includes a PROAV directory 122. The PROAV directory 122 includes titles and comments for all material data (content data such as video and audio data) recorded on the optical disc 71; a disc metafile (DISCMETA. XML) 123, which is a file including information such as a password of video data corresponding to a representative picture as a representative frame of all video data recorded on the optical disc 71; an index file (INDEX. XML) 124 including management information for managing all clip data and edit lists recorded on the optical disc 71; and an index file (INDEX. BUP) 125. The index file 125 is a duplication of the index file 124. By preparing the two files, reliability is enhanced.

The PROAV directory 122 further includes a disc information file (DISCINFO. XML) 126 and a disc information file (DISCINFO. BUP) 127, which are files including metadata for the entire data recorded on the optical disc 71, for example, information of a playback history and so on. The disc information file 127 is a duplication of the disc information file 126. By preparing the two files, reliability is enhanced.

In addition, the PROAV directory 122 includes a clip root directory (CLPR) 128 having a subordinate directory storing clip data; and an edit list root directory (EDTR) 129 having a subordinate directory storing data of edit lists.

In the clip root directory 128, the clip data recorded on the optical disc 71 is managed in different directories for respective clips. For example, in FIG. 5, data of three clips are managed in three directories: a clip directory (C0001) 131; a clip directory (C0002) 132; and a clip directory (C0003) 133. More specifically, each data of a first clip recorded on the optical disc 71 is managed as a file of a subordinate directory of the clip directory 131, each data of a second clip recorded on the optical disc 71 is managed as a file of a subordinate directory of the clip directory 132, and each data of a third clip recorded on the optical disc 71 is managed as a file of a subordinate directory of the clip directory 133.

On the other hand, in the edit list root directory 129, edit lists recorded on the optical disc 71 are managed in different directories corresponding to respective editing processes. For example, in FIG. 5, four edit lists are managed in four directories: an edit list directory (E0001) 134; an edit list directory (E0002) 135; an edit list directory (E0003) 136; and an edit list directory (E0004) 137. More specifically, an edit list indicating a first edit result of a clip recorded on the optical disc 71 is managed as a file of a subordinate directory of the edit list directory 134, an edit list indicating a second edit result is managed as a file of a subordinate directory of the edit list directory 135, an edit list indicating a third edit result is managed as a file of a subordinate directory of the edit list directory 136, and an edit list indicating a fourth edit result is managed as a file of a subordinate directory of the edit list directory 137.

In the subordinate directory of the clip directory 131 provided in the above-described clip root directory 128, portions of data of the clip that is first recorded on the optical disc 71 are provided and managed as files shown in FIG. 6.

In FIG. 6, the clip directory 131 includes the following files: a clip information file (C0001C01. SMI) 141 for managing this clip; a video data file (C0001V01. MXF) 142 including video data of this clip; eight audio data files (C0001A01. MXF to C0001A08. MXF) 143 to 150 including audio data of respective channels of this clip; a low-resolution data file (C0001S01. MXF) 151 including sub-stream data (low-resolution data) of this clip; a clip metadata file (C0001M01. XML) 152 corresponding to material data of this clip and including clip metadata which is non-realtime metadata requiring no realtime performance; a frame metadata file (C0001R01. BIM) 153 corresponding to material data of this clip and including frame metadata which is realtime metadata requiring a realtime performance; and a picture pointer file (C0001I01. PPF) 154 describing a frame structure of the video data file 142 (e.g., information about a compression method, such as the MPEG; in each picture and information including an offset address from the top of a file).

The low-resolution data file 151 includes low-resolution data of the video data file 142 and the audio data files 143 to

150. The content of the low-resolution data file 151 is the same as that of those files. For example, the video data in the video data file 142 is compressed by an MPEG 2 (moving picture experts group phase 2) method, whereas the video data included in the low-resolution data file 151 is compressed at a lower bit rate by an MPEG 4 (moving picture experts group phase 4) method. Further, a picture size of the video data in the video data file 142 is a VGA (video graphics array) size (640×480 dots), whereas a picture size of the video data included in the low-resolution data file 151 is reduced to about ¼ in a CIF (common intermediate format) size (352× 288 (or 240) dots).

The data in the low-resolution data file 151 is used instead of main data in the video data file 142 and the audio data files 143 to 150 when the amount of the main data is too large. For example, when material data such as video and audio data is transferred from an apparatus in a shooting location to an apparatus in an edit studio through a communication network, such as the Internet, in order to produce a program, the data of the low-resolution data file 151 is transferred because the main data is too large. In this way, by supplying the low-resolution data to the editor through the Internet or the like and then supplying the main data to the editor through a recording medium, the editor can create an edit list by performing editing by using the low-resolution data. Accordingly, since the editor can perform editing before the main data is supplied thereto through a recording medium, the editor only has to create perfect packaged data as an edit result based on the main data by using the edit list after receiving the main data, so that the editing can be swiftly performed.

When the data in the video data file 142 is moving picture data, the video data in the low-resolution data file 151 is also moving picture data. That is, as will be described later, the data in the low-resolution data file 151 is used for generating thumbnails of a clip, but is not generated only for displaying the thumbnails.

In FIG. 6, each of the video data, the low-resolution data, and the frame metadata, which is required to have a realtime performance at playback, is managed as one file, so that reading time thereof does not increase.

Also, the audio data is required to have a realtime performance at playback. Eight channels are assigned to the audio data in order to adapt multi-channels such as a 7.1 channel, so that the audio data of each channel is managed as one file. Herein, the audio data is managed in eight files, but the number of files corresponding to the audio data may be seven or less, or nine or more.

Likewise, the video data, the low-resolution data, and the frame metadata may be managed in two or more files as necessary.

In FIG. 6, the clip metadata which is not required to have a realtime performance is managed as a file different from the frame metadata which is required to have a realtime performance. This prevents reading of unnecessary metadata during a normal playback of video data and so on, thereby leading to a decrease in time for a playback process and loads required for the process.

The clip metadata file 152 is described in an XML (extensible markup language) format to apply versatility thereto, whereas the frame metadata 153 is described in a BIM (binary format for MPEF-7 data) format, which is made by compiling a file of an XML format, in order to decrease time for a playback process and loads required for the process.

The example of the file configuration of the clip directory 131 shown in FIG. 6 can be applied to every clip directory corresponding to each clip recorded on the optical disc 71. In other words, the file configuration shown in FIG. 6 can be applied to the other clip directories 132 and 133 shown in FIG. 5, and thus the description thereof is omitted.

The files included in the clip directory corresponding to one clip have been described above. However, the file configuration is not limited to the above-described one, but any configuration can be accepted as long as a clip metadata file corresponding to the clip exists in the subordinate directory of each clip directory.

Next, an example of a file configuration in a subordinate directory of the edit list root directory 129 is described with reference to FIG. 7. In a subordinate directory of the edit list directory 135 provided in the above-described edit list root directory 129, data of an edit list serving as information about a second edit result of each data of a clip recorded on the optical disc 71 is provided and managed as files shown in FIG. 7.

Referring to FIG. 7, the edit list directory 135 includes an edit list file (E0002E01. SMI) 161 for managing this edit result (edit list); and a clip metadata file (E0002M01. XML) 162 for an edit list, which includes clip metadata corresponding to material data after editing (a portion extracted as after-edit data in material data of all clips used in editing) or clip metadata newly generated based on the clip metadata.

The clip metadata file 162 for an edit list includes clip metadata that is newly generated based on clip metadata of a clip used in editing (the clip metadata file existing in a subordinate directory of the clip root directory 128) based on the edit result. For example, after editing has been done, a portion corresponding to after-edit essence data is extracted from the clip metadata included in the clip metadata file 152 shown in FIG. 6, new clip metadata in which after-edit material data is regarded as one clip is reconfigured by using the portion, and the new clip metadata is managed as a clip metadata file for an edit list. That is, new clip metadata in which the after-edit essence data is regarded as one clip is added to the after-edit material data, and the clip metadata is managed as a clip metadata file for an edit list. Thus, the clip metadata file for an edit list is generated every time editing is performed.

Incidentally, the clip metadata file 162 for an edit list is described in an XML format in order to apply versatility thereto.

The example of the file configuration of the edit list directory 135 shown in FIG. 7 can be applied to every edit list (edit result). In other words, the file configuration shown in FIG. 7 can be applied to the other edit list directories 134, 136, and 137 shown in FIG. 5, and thus the description thereof is omitted.

The files included in the edit list directory have been described above. However, the file configuration is not limited to the above-described one, but any configuration can be accepted as long as a clip metadata file for an edit list corresponding to the editing exists in the subordinate directory of each edit list directory.

Figure 8:
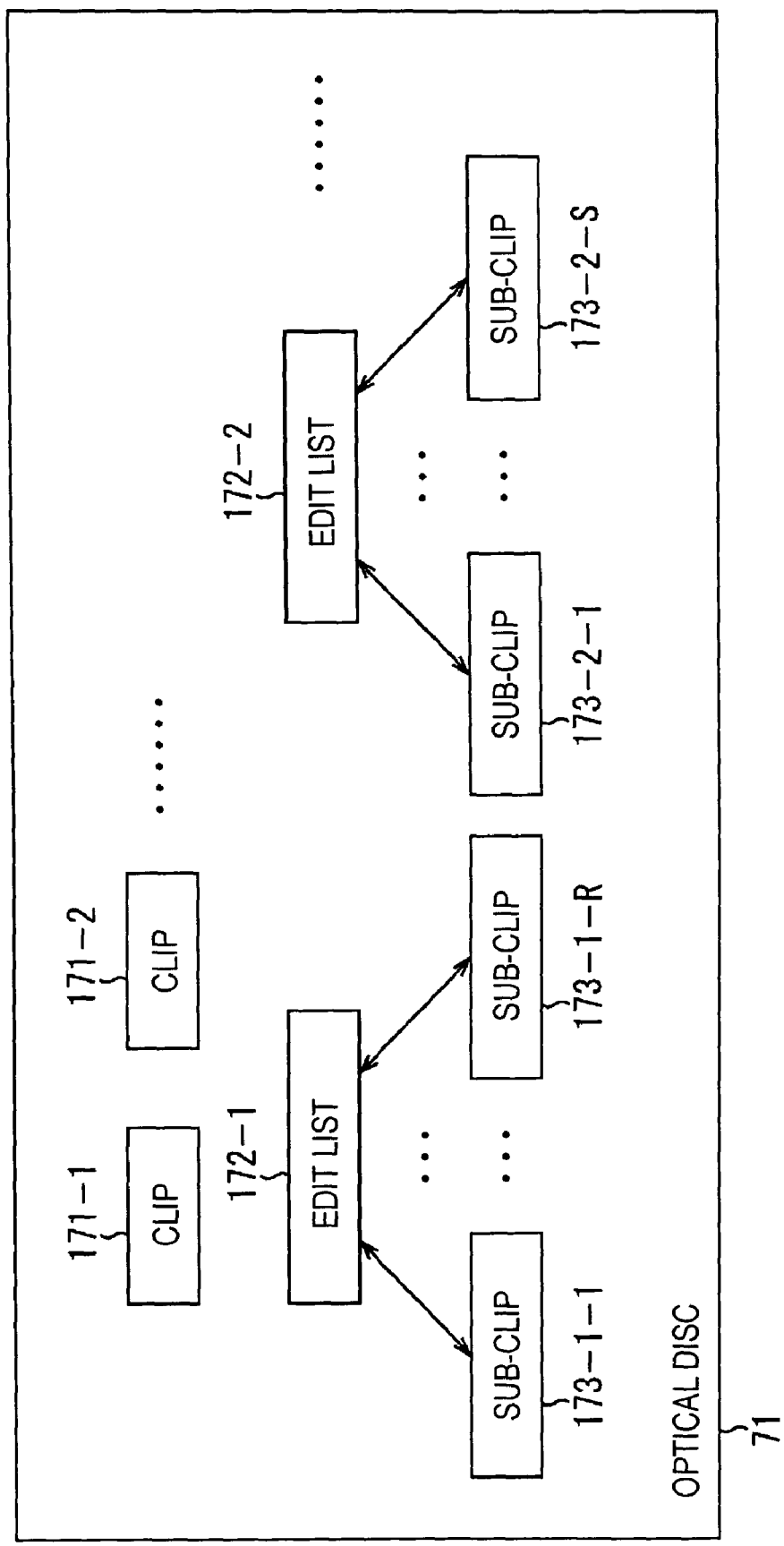
FIG. 8 is a schematic view illustrating an example a relationship between clips and sub-clips.

As described above, clips and edit lists are recorded on the optical disc 71. The edit list is text information described in an XML or the like indicating an edit result and specifies one or more clips used in editing. In the edit list, a clip belonging to the edit list is referred to as a sub-clip. That is, as shown in FIG. 8, clips 171: a clip 171-1, a clip 171-2, are recorded on the optical disc 71. Further, edit lists 172 for specifying sub-clips 173: an edit list 172-1 to which sub-clips 173-1-1 to 173-1-R belong, an edit list 172-2 to which sub-clips 173-2-1 to 173-2-S belong, are recorded on the optical disc 71. Each of the sub-clips 173 may have data while being independent from the clip 171 or may be configured as part of the clip 171 (among the clips 171, a clip belonging to the edit list 172 may be regarded as the sub-clip 173).

The editor 31 shown in FIG. 4 generates thumbnails of the clips 171 or the sub-clips 173 belonging to the edit lists 172 and displays an index of the thumbnails on the display of the monitor unit 112. Then, the editor 31 receives specification of a clip (sub-clip) input by a user referring to the index of the thumbnails displayed on the display, and plays back or edits the clip 171, the edit list 172, or the sub-clip 173 that has been specified.

Figure 9:
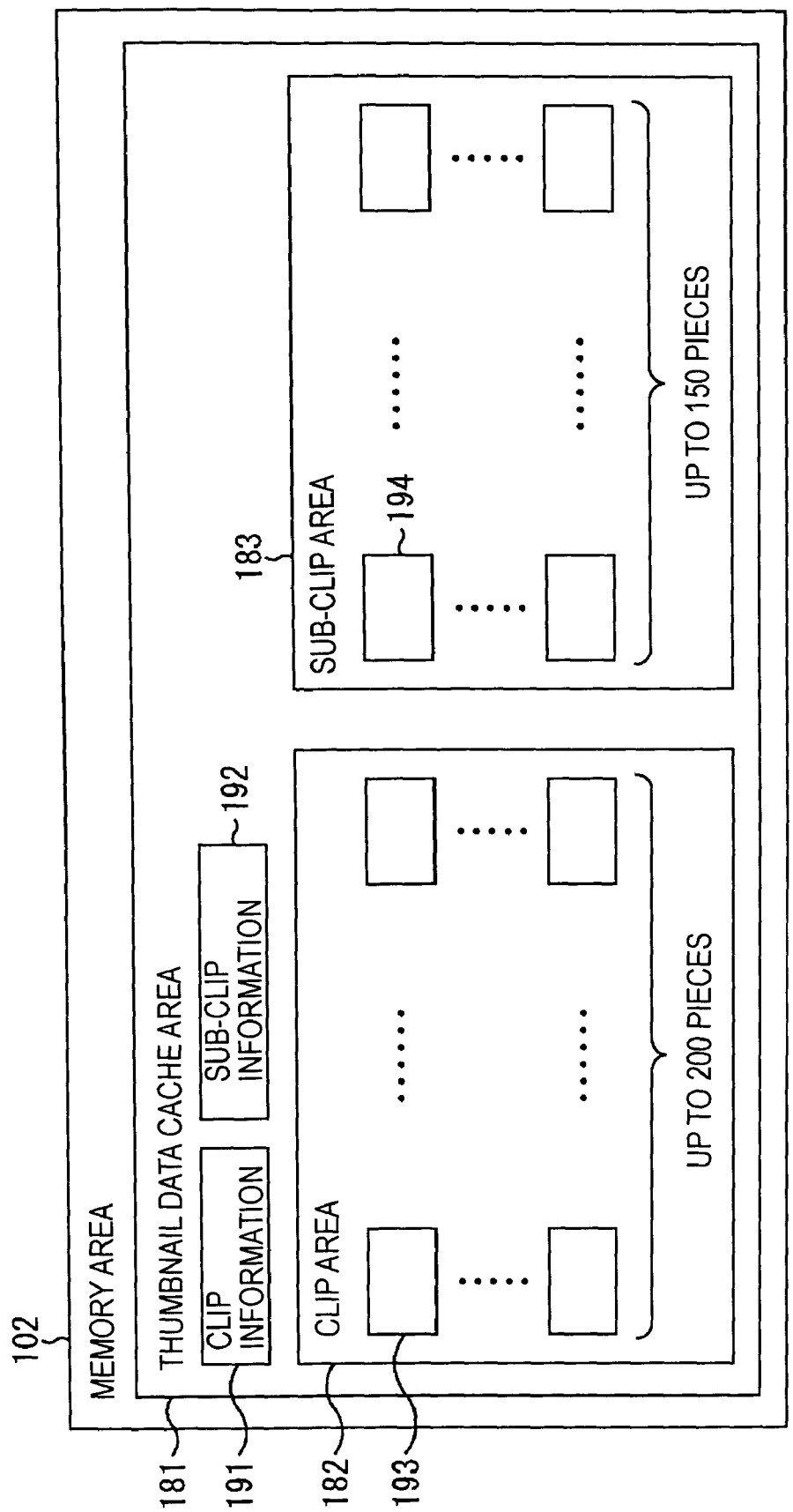
FIG. 9 is a schematic view showing an example of an internal configuration of a memory area of an SDRAM shown in FIG. 4.

FIG. 9 is a schematic view showing an example of a configuration of the memory area 102 of the SDRAM 92 provided in the editor 31 shown in FIG. 4. The memory area 102 caches thumbnail data generated in the above-described manner.

In FIG. 9, the memory area 102 is provided with a thumbnail data cache area 181, which is a dedicated area for caching (holding) thumbnail data generated from the clips 171 or the sub-clips 173 in the optical disc 71. Further, a clip area 182 and a sub-clip area 183 are provided inside the thumbnail data cache area 181.

Clip information 191 and sub-clip information 192 are stored in the thumbnail data cache area 181. The clip information 191 is used for managing thumbnail data cached in the SDRAM 92 and associates the thumbnail data with the clips 171. The clip information 191 is generated by reading necessary information from the index file 124 shown in FIG. 5 or the clip information file 141 shown in FIG. 6. The details will be described later.

The sub-clip information 192 is similar to the clip information 191 and is used for managing thumbnail data cached in the SDRAM 92. Note that, the sub-clip information 192 associates thumbnail data with the sub-clips 173. The sub-clip information 192 is generated by reading necessary information from the index file 124 shown in FIG. 5 or the edit list file 161 shown in FIG. 7. The details will be described later.

The clip area 182 is a dedicated area for caching thumbnail data 193 generated from the clips 171. The exemplary clip area 182 is capable of storing up to 200 thumbnails of data 193. Likewise, the sub-clip area 183 is a dedicated area for caching thumbnail data 194 generated from the sub-clips 173 (generated based on the edit list 172). The exemplary sub-clip area 183 is capable of storing up to 150 thumbnails of data 194. Thus, the clip area 182 does not cache the thumbnail data 194 generated from the sub-clips 173 (generated based on the edit list 172). Likewise, the sub-clip area 183 does not cache the thumbnail data 193 generated from the clips 171. Those skilled in the art will recognize tat the number of thumbnails of areas 182 and 183 are exemplary only and that more or less thumbnails may be provided, as desired.

Figure 10A:
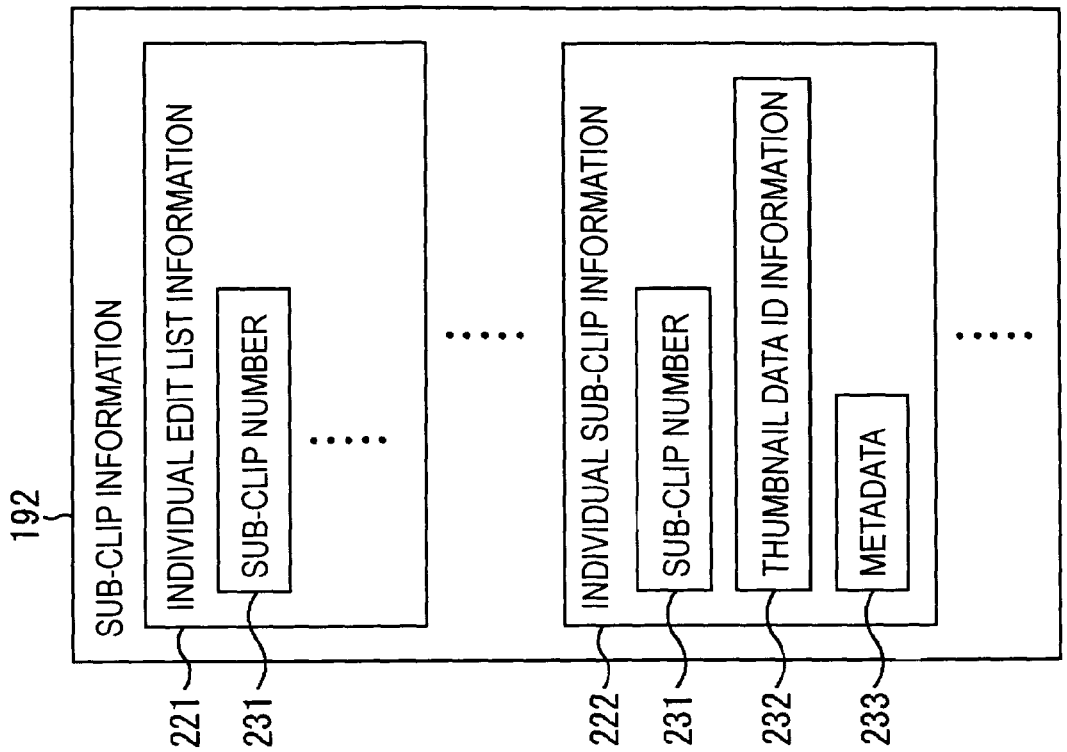
FIGS. 10A and 10B are schematic views illustrating an example of configurations of clip information and sub-clip information shown in FIG. 9.

Next, the clip information 191 and the sub-clip information 192 shown in FIG. 9 are described. As shown in FIG. 10A, the clip information 191 includes individual clip information 201 corresponding to the respective clips 171. In other words, the clip information 191 includes individual clip information 201, the number thereof being equal to that of the clips 171 recorded on the optical disc 71.

Each individual clip information 201 includes a clip number 211, thumbnail data ID (identification) information 212, and metadata 213. The clip number 211 is ID information of the clip 171 corresponding to the individual clip information 201. The thumbnail data ID information 212 is ID information of the thumbnail data 193 that is generated from the clip 171 having the clip number 211 and that is cached in the clip area 182. That is, the individual clip information 201 associates the clip number 211 with the thumbnail data ID information 212, thereby associating the thumbnail data 193 cached in the clip area 182 with the clip 171. The metadata 213 is metadata included in the clip 171 having the clip number 211 (metadata of the clip metadata file 152 and the frame metadata file 153), and includes a time code, a clip name, and so on which are displayed together with a thumbnail. That is, the individual clip information 201 further associates the metadata 213 with the clip number 211 (thumbnail data ID information 212). The clip information 191 may be table information in which instances of the individual clip information 201 are aligned in rows (elements including the clip number 211, the thumbnail data ID information 212, and the metadata 213 are associated with each other).

Figure 10B:
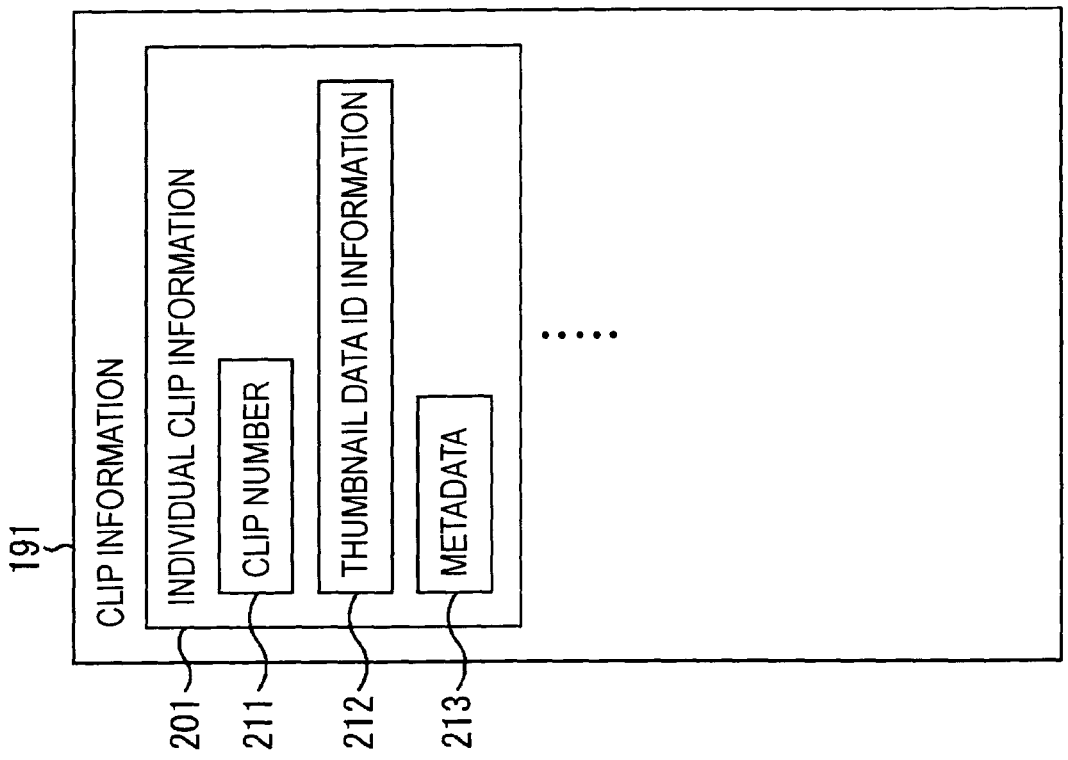

As shown in FIG. 10B, the sub-clip information 192 includes individual edit list information 221 corresponding to the respective edit lists and of individual sub-clip information 222 corresponding to the respective sub-clips. In other words, the sub-clip information 192 includes individual edit list information 221, the number thereof being equal to that of the edit lists 172 recorded on the optical disc 71; and individual sub-clip information 222, the number thereof being equal to that of the sub-clips 173 belonging to the edit lists 172.

Each of the individual edit list information 221 includes sub-clip numbers 231 serving as ID information of the sub-clips 173 belonging to the edit list. Each individual sub-clip information 222 includes a sub-clip number 231, thumbnail data ID information 232, and metadata 233, and associates these information with each other. In other words, the individual sub-clip information 222 associates the sub-clip number, the thumbnail data 194 which is generated from the sub-clip and which is cached in the sub-clip area 183, and the metadata of the sub-clip together. As in the clip information 191, the sub-clip information 192 may be formed as table information. In that case, however, the sub-clip information 192 includes two tables: a table for individual edit list information 221 and a table for individual sub-clip information 222.

As described above, of the thumbnails of data 193 cached in the clip area 182 and of the thumbnails of data 194 cached in the sub-clip area 183 are managed by the clip information 191 and the sub-clip information 192, respectively. The clip information 191 includes the individual clip information 201 corresponding to all of the clips 171 recorded on the optical disc 71, and also includes the individual clip information 201 corresponding to the clip 171 whose thumbnail data 193 is not cached in the clip area 182. This is the same for the sub-clip information 192.

Next, a method for generating the thumbnail data 193 and the thumbnail data 194 cached in the memory area 102 is described.

FIG. 11 is a schematic view showing an example of a method for generating the thumbnail data 193 based on the clip 171 recorded on the optical disc 71.

As shown in FIG. 11, the editor 31 generates a thumbnail of the clip 171 by using the data of the low-resolution data file 151. Proxy data 241 is the data of the low-resolution data file 151. Video data of the proxy data 241 is compressed by an MPEG 4 method and a picture size thereof is a CIF size (352×288 dots).

The drive 51 of the editor 31 extracts video data 242 of 1 GOP (group of pictures) corresponding to, for example, 10 frames, from the proxy data 241 of the clip 171 recorded on the loaded optical disc 71, and supplies the video data 242 to the buffer memory 53 under control by the controller 51. The buffer memory interface 61 of the buffer memory 53 allows the memory area 62 to hold the supplied video data 242 of 1 GOP.

The decoder 54 extracts frame video data 243, which is video data of one frame, from the video data 242 under control by the controller 51. The frame video data 243 is video data in a YUV format, in which colors are represented by: a luminance signal (Y); a difference between the luminance signal and a red color component (U); and a difference between the luminance signal and a blue color component (V). A size of a picture corresponding to the frame video data 243 is a CIF size (352×288 dots).

A frame picture of the frame video data 243 serves as a representative picture of the clip 171. As the representative picture, a top frame of the clip is usually set unless otherwise specified by metadata or the like.

After the frame video data 243 has been generated, the buffer memory interface 61 reads the frame video data 243 from the memory area 62 and transfers it to the SDRAM 92 through the PCI bus 81 under control by the controller 51. The SDRAM interface 101 of the SDRAM 92 obtains the frame video data 243 and allows the memory area 102 to hold it under control by the controller 91.

The video processing unit 93 reduces the picture size of the frame video data 243 from a CIF size (352×288 dots) to a thumbnail size (118×96 dots) and converts the data format from the YUV format to an RGB format, in which colors are represented by: red (R); green (G); and blue (B), so as to generate thumbnail data 193 under control by the controller 91.

The editor 31 performs the above-described process in order to generate the thumbnail data 193 from the clip 171. Incidentally, the thumbnail data 194 can be generated from the sub-clip 173 in the same manner as in the clip 171, and thus the corresponding description is omitted.

The controller 91 of the editor 31 controls the SDRAM interface 101, supplies the thumbnail data 193 or 194 generated in the above-described manner to the display unit 44, and displays an index of thumbnails on the display. At this time, the SDRAM interface 101 supplies a group of thumbnail data to be displayed on one screen by the monitor unit 112 at one time.

Figure 12:
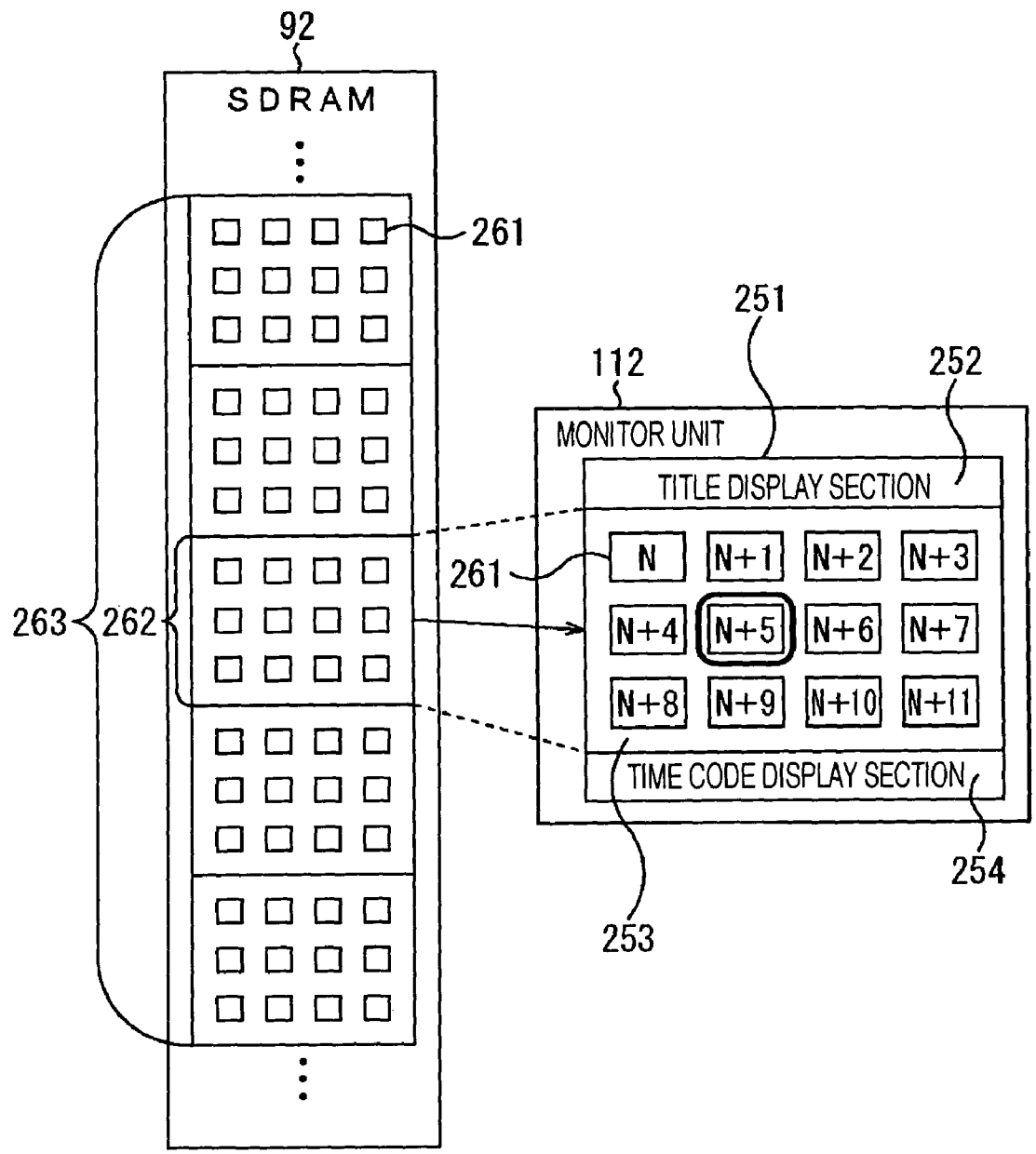
FIG. 12 is a schematic view illustrating a relationship between output video data/priority video data and a screen.

More specifically, assume that the monitor unit 112 displays a screen 251 on the display as shown in FIG. 12. The screen 251 includes a title display section 252 displaying a title of a clip corresponding to a thumbnail that is specified by a user with a cursor; a thumbnail index display section 253 displaying an index of twelve thumbnails; and a time code display section 254 displaying a starting time code of the clip corresponding to the thumbnail specified by the user with the cursor. In the thumbnail index display section 253, twelve thumbnails 261 respectively having clip numbers N to N+11 are displayed at the same time. At this time, the controller 91 controls the SDRAM interface 101 in order to supply twelve thumbnails of data 193 or 194 to the display unit 44.

In other words, when twelve thumbnails 261 are displayed at one time in the display unit 44, the controller 91 sets an output unit number of thumbnail data output from the SDRAM 92 to 12, and sets the twelve thumbnails of data to output video data 262.

Further, the controller 91 controls the SDRAM interface 101 in order to set thumbnail data corresponding to the thumbnails 261 of the output video data 262 and the thumbnails 261 of up to each two screens before and after the output video data 262 as priority video data 263, in accordance with clip numbers.

As shown in FIG. 12, the monitor unit 112 displays twelve thumbnails on the screen 251 in order of the clip number. When all thumbnails 261 corresponding to the clips recorded on the optical disc 71 cannot be displayed on one screen 251 (when there are thirteen or more thumbnails 261), the editor 31 displays these thumbnails 261 on a plurality of screens 251.

Figure 13:
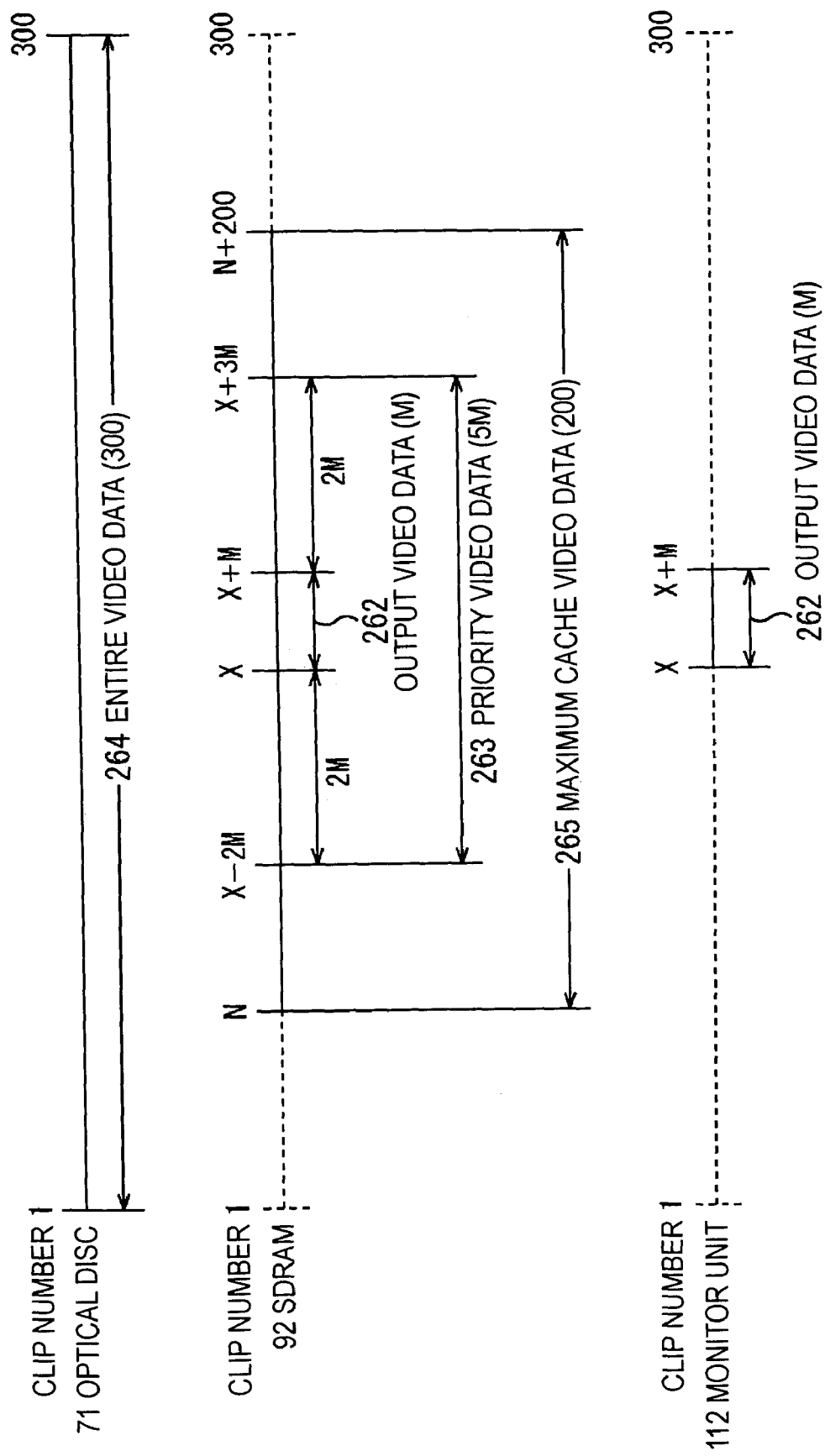
FIG. 13 is a schematic view illustrating a relationship among the output video data, the priority video data, maximum cache video data, and entire video data.

An example is described below with reference to FIG. 13. Up to 300 clips can be recorded on the optical disc 71. As shown in the top of FIG. 13, assume that 300 clips of clip numbers 1 to 300 are recorded on the optical disc 71 (entire video data 264). At this time, the number of portions of the entire video data 264 is 300 as indicated in parentheses.

Compared to the optical disc 71, the SDRAM 92 can cache 200 thumbnails of data 193, as shown in the middle of FIG. 13. For example, the SDRAM 92 can cache the thumbnail data 193 corresponding to 200 clips of clip numbers N to N+200. That is, the number of maximum cache thumbnails of video data 265 is 200, as indicated in parentheses.

In this SDRAM 92, assume that M thumbnails of data 193 corresponding to clips of clip numbers X to X+M are set as the output video data 262. The controller 91 sets 5M thumbnails of data 193 in total, including the output video data 262 and up to each 2M thumbnails of data 193 before and after the output video data 262, as the priority video data 263, and allows the SDRAM 92 to preferentially hold the priority video data 263.

In the middle of FIG. 13, thumbnail data corresponding to 5M clips of clip numbers (X−2M) to (X+3M) is set as the priority video data 263.

That is, the editor 31 caches the priority video data 263 as shown in the middle of FIG. 13 in the entire video data 264 recorded on the optical disc 71 as shown in the top of FIG. 13, and then supplies the output video data 262 in the priority video data 263 to the monitor unit 112 as shown in the bottom of FIG. 13, so as to display thumbnails on one screen.

An output of the output video data 262 is described next with reference to FIG. 14.

Figure 14:
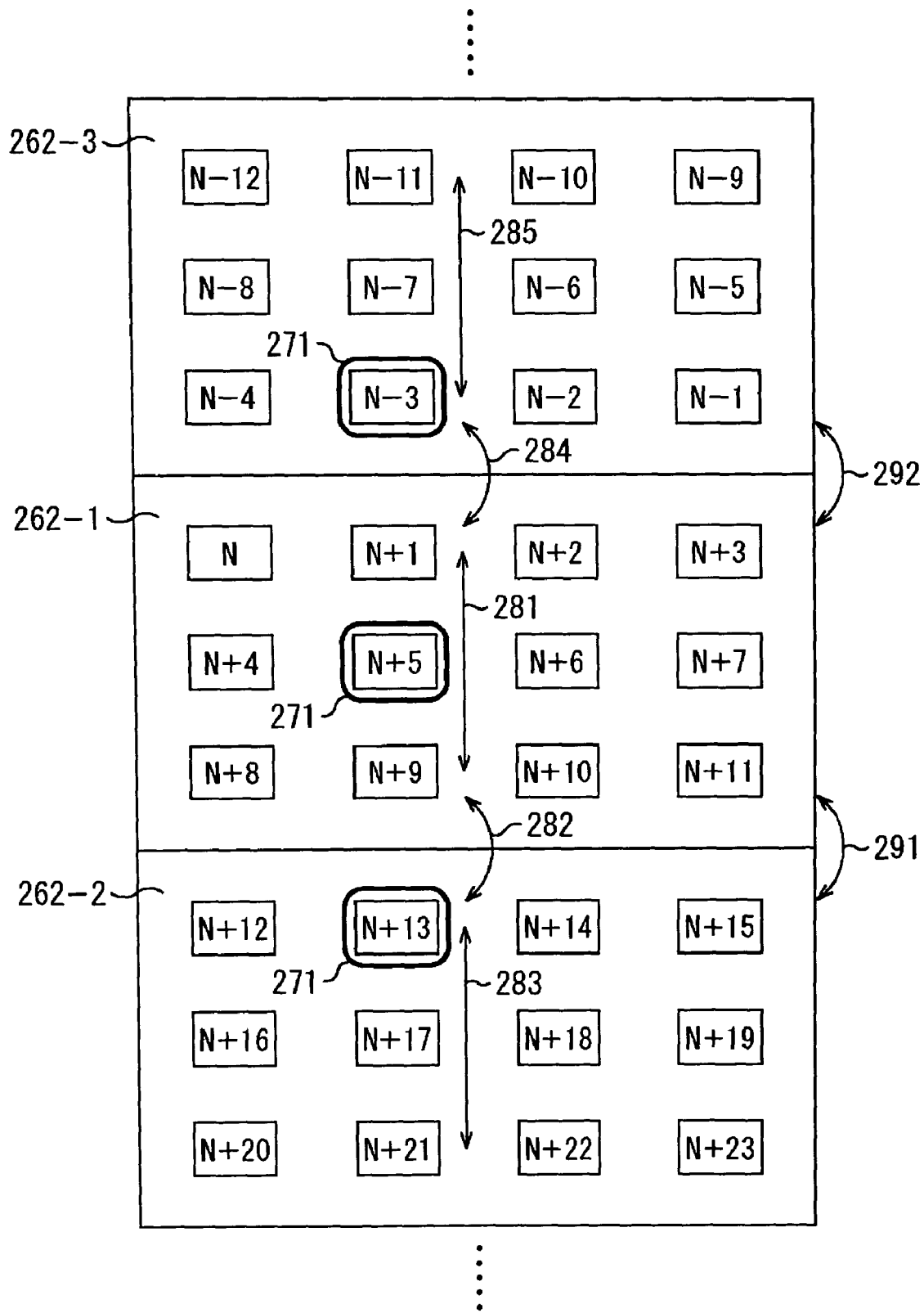
FIG. 14 is a schematic view illustrating changes of the output video data.

Assume that output video data 262-1 shown in the middle of FIG. 14 is displayed on the thumbnail index display section 253 of the screen 251, which is displayed on the display of the monitor unit 112. That is, in this case, twelve thumbnails 261 corresponding to clips of clip numbers N to N+11 are displayed on the thumbnail index display section 253.

In this state, when a cursor 271 is operated by a user to move in the output video data 262-1 (in the thumbnail index display section 253) as indicated by a double-headed arrow 281, the display in the thumbnail index display section 253 does not change. In other words, the position of the cursor 271 moves and the thumbnail 261 specified by the cursor 271 changes, but the twelve thumbnails 261 (thumbnails 261 of the output video data 262-1) corresponding to the clips of clip numbers N to N+11 are kept to be displayed in the thumbnail index display section 253. The display position of the respective thumbnails 261 does not change.

On the other hand, when the cursor 271 moves from the output video data to another as indicated by a double-headed arrow 282 of FIG. 14, the controller 91 controls the SDRAM interface 101 to supply the output video data 262 specified by the cursor to the display unit 44, so as to change the display on the monitor unit 112 as indicated by a double-headed arrow 291 of FIG. 14.

For example, in FIG. 14, when the position specified by the cursor 271 moves from the thumbnail 261 corresponding to the clip of a clip number (N+9) to the thumbnail 261 corresponding to the clip of a clip number (N+13), output video data 262-2 is read from the SDRAM 92 as new output video data 262 and is supplied to the display unit 44. Then, the thumbnails 261 corresponding to the clips of clip numbers (N+12) to (N+23) (thumbnails 261 of the output video data 262-2) are displayed in the thumbnail index display section 253. In this state, the cursor 271 positions on the thumbnail 261 corresponding to the clip number (N+13).

When the position specified by the cursor 271 moves from one thumbnail 261 to another within the output video data 262-2 as indicated by a double-headed arrow 283, the position of the cursor 271 changes but the display (position) of the thumbnails 261 does not change, as in the above-described output video data 262-1.

This is the same for a case when the position specified by the cursor 271 moves in directions indicated by a double-headed arrow 284 of FIG. 14. That is, the controller 91 controls the SDRAM interface 101 to supply the output video data 262 specified by the cursor to the display unit 44 and to change the display of the monitor unit 112 as indicated by a double-headed arrow 292 of FIG. 14.

For example, in FIG. 14, when the position specified by the cursor 271 moves from the thumbnail 261 corresponding to the clip of a clip number (N+1) to the thumbnail 261 corresponding to the clip of a clip number (N−3), output video data 262-3 is read from the SDRAM 92 as new output video data 262 and is supplied to the display unit 44. Then, the thumbnails 261 corresponding to the clips of clip numbers (N−12) to (N−1) (thumbnails 261 of the output video data 262-3) are displayed in the thumbnail index display section 253. In this state, the cursor 271 positions on the thumbnail 261 corresponding to the clip number (N−3).

In this case, too, when the position specified by the cursor 271 moves from one thumbnail 261 to another within the output video data 262-3 as indicated by a double-headed arrow 285, the position of the cursor 271 changes but the display (position) of the thumbnails 261 does not change, as in the above-described output video data 262-1.

As described above, the thumbnail data output from the SDRAM 92 is changed in units of output video data 262, from a current screen to a previous or next screen according to clip numbers. Therefore, the controller 91 sets the thumbnail data 193 or 194 for five screens that is likely to be output next: the output video data 262 that is currently displayed and each two screens before and after the output video data 262, as the priority video data 263.

In this method, the thumbnail data that is output next by changing the output video data 262 is set as the priority video data 263, and thus the thumbnail data is more likely to be cached in the SDRAM 92. That is, the editor 31 can supply the thumbnail data to the display unit 44 from the SDRAM 92, which has a higher access speed than that of the optical disc 71, with a higher possibility. Accordingly, time for displaying thumbnails on the monitor unit 112 can be shortened. Further, the editor 31 caches the thumbnail data in the SDRAM 92. In other words, the thumbnail data has been generated by the time when the thumbnail data is supplied from the SDRAM 92 to the display unit 44. Accordingly, the editor 31 can display thumbnails on the monitor unit 112 at higher speed, and thus a user can easily select a desired portion of video data from among a plurality of portions of video data corresponding to the thumbnails. The editor 31 generates in advance a thumbnail of a clip which is not required to be displayed at an appropriate timing and caches the thumbnail data in the SDRAM 92, but does not record the thumbnail data on the optical disc 71 in advance. Therefore, an occupied storage area in the optical disc 71 does not change, and thus the editor 31 can shorten the time to display the thumbnail data without increasing the amount of data to be dealt with.

In a case where the priority video data 263 changes in response to change of the output video data 262 so that new thumbnail data is cached in the SDRAM 92, if the maximum cache video data 265 has already been cached in the SDRAM 92 and if a free space in the memory area 102 is insufficient, the SDRAM interface 101 erases unnecessary data in order to cache thumbnail data set as the priority video data 263 under control by the controller 91.

Figure 15:
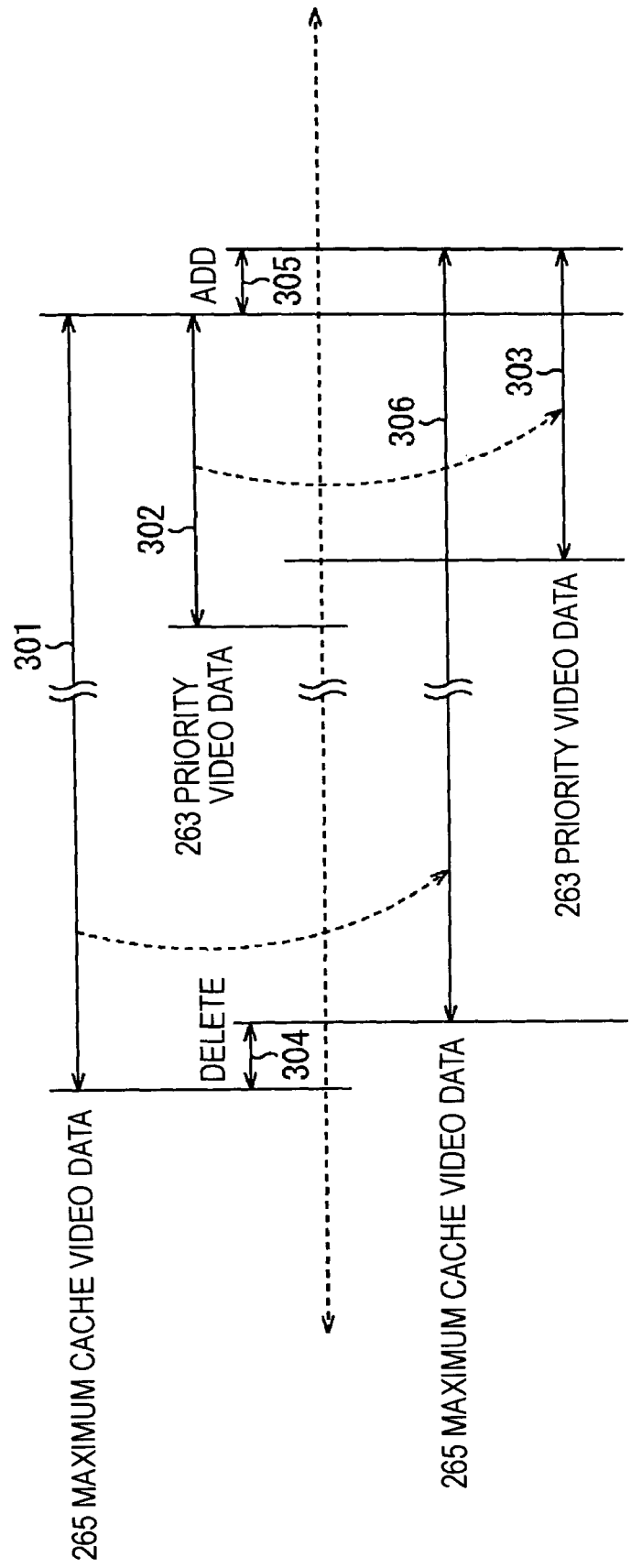
FIG. 15 is a schematic view illustrating an example of a method for updating cached video data.

For example, as shown in FIG. 15, assume that thumbnail data in a range indicated by a double-headed arrow 301 is cached as the maximum cache video data 265 in the SDRAM 92 and that the priority video data 263 is set in a range indicated by a double-headed arrow 302, with respect to thumbnails of data aligned in order of clip number in a horizontal direction. In this state, when a user moves the cursor 271, so that the range of the priority video data 263 changes as indicated by a double-headed arrow 303, the SDRAM interface 101 deletes a necessary number of thumbnails of data far from the range of the priority video data 263 so as to obtain a free space in the maximum cache video data 265. In other words, the SDRAM interface 101 deletes the thumbnails of data in a range indicated by a double-headed arrow 304 shown in FIG. 15 and adds (newly caches) the thumbnail data in a range indicated by a double-headed arrow 305 under control by the controller 91. Accordingly, the range of the maximum cache video data 265 is changed as indicated by a double-headed arrow 306.

As described above, thumbnail data for five screens including the output video data 262 is basically set as the priority video data 263 in the SDRAM 92. However, if thumbnail data for two screens does not exist before or after the output video data 262, video data set as the priority video data 263 is reduced accordingly.

Figure 16:
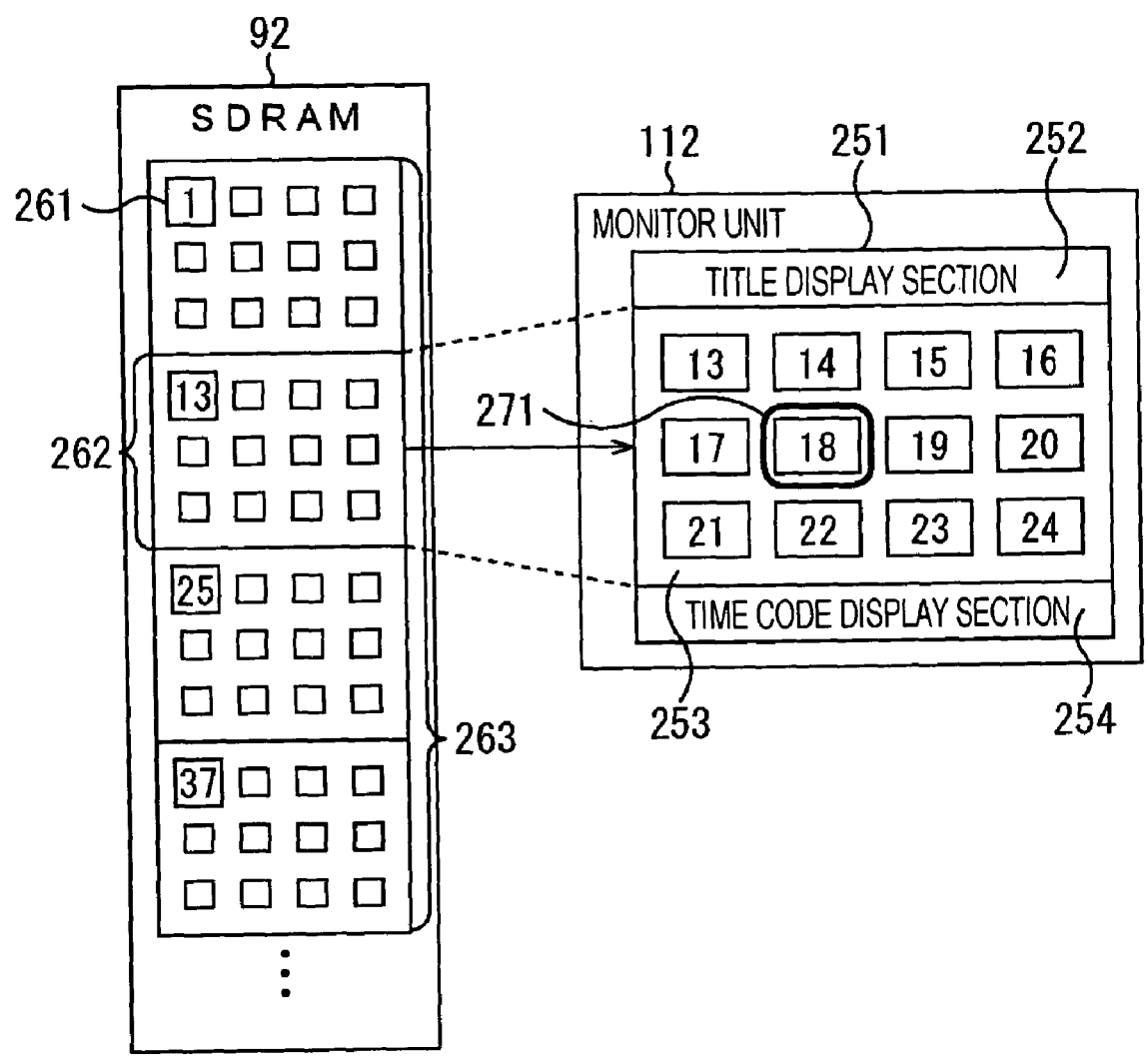
FIG. 16 is a schematic view illustrating an example of the priority video data.

For example, as shown in FIG. 16, when the thumbnail data 193 corresponding to clips of clip numbers 13 to 24 is set as the output video data 262, the thumbnail data 193 for only one screen corresponding to clips of clip numbers 1 to 12 exists before the output video data 262. In this case, the editor 31 sets the thumbnail data 193 for four screens (the thumbnail data 193 corresponding to clips of clip numbers 1 to 48) as the priority video data 263, as shown in FIG. 16. That is, in this case, the number of thumbnails of data 193 set as the priority video data 263 may correspond to five screens or less (predetermined maximum or less).

Hereinafter, a specific process of the above-described cache control is described.

Figure 17:
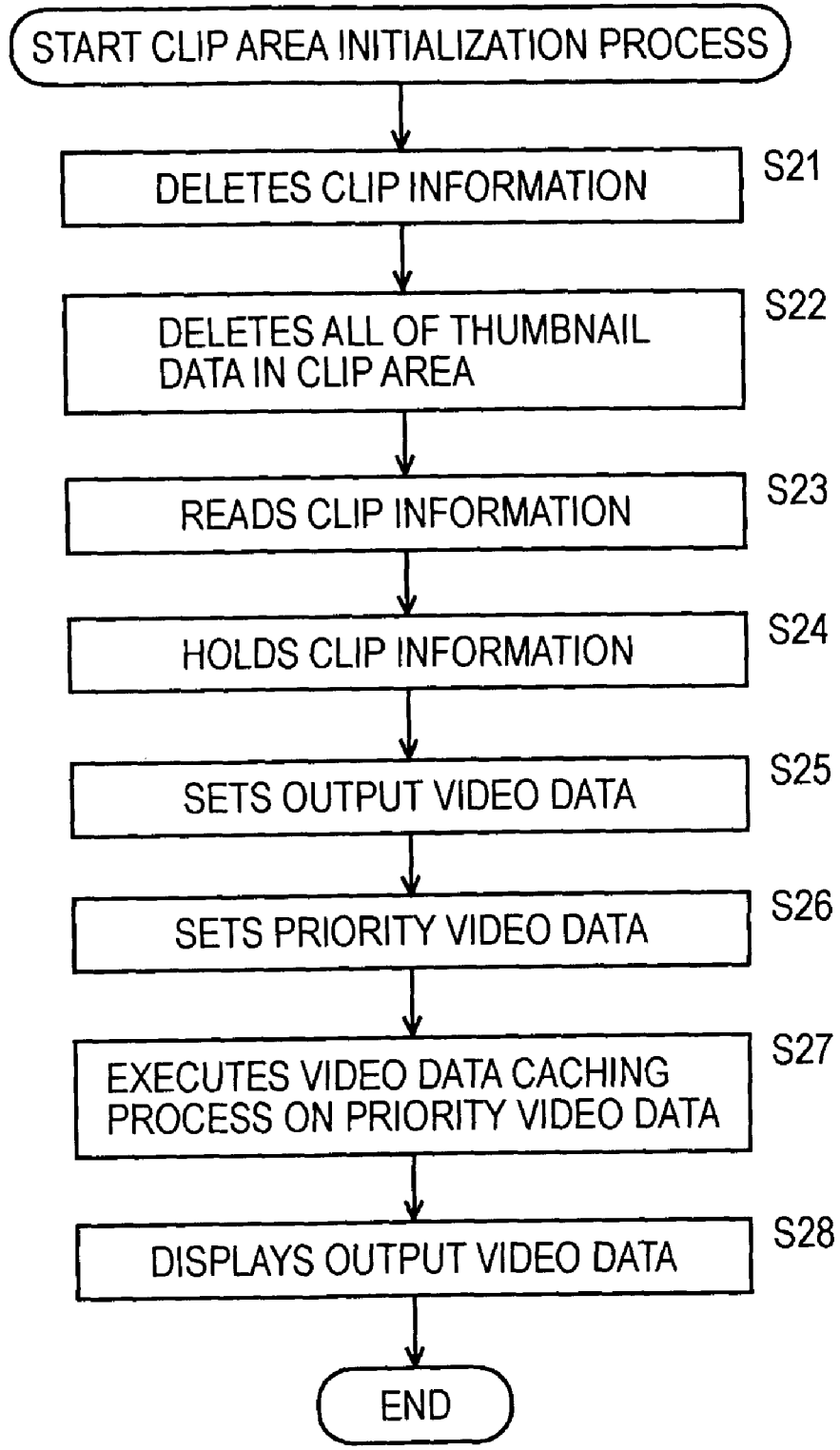
FIG. 17 is a flowchart illustrating an example of a clip area initialization process.

First, a clip area initialization process is described with reference to the flowchart shown in FIG. 17. The controller 91 executes this clip area initialization process by controlling the SDRAM interface 101 when the power of the editor 31 is turned on, when the optical disc 71 is loaded to the drive 52, or when a user provides instructions to execute the initialization process of the clip area 182 of the SDRAM 92.

After the clip area initialization process starts, the SDRAM interface 101 deletes the clip information 191 held in the thumbnail data cache area 181 in the memory area 102 under control by the controller 91 in step S21. Then, in step S22, the SDRAM interface 101 deletes all of the thumbnail data 193 in the clip area 182 under control by the controller 91. In step S23, the controller 91 controls the controller 51 to read the clip information 191 from the optical disc 71. The controller 51 controls each unit of the storage unit 41 to read the clip information 191 from the optical disc 71 and to supply it to the SDRAM 92 in the holding unit 42. The SDRAM interface 101 obtains the clip information 191 and allows the memory area 102 to hold it under control by the controller 91 in step S24.

In step S25, the controller 91 sets the output video data 262 based on the clip information 191, and in step S26, the controller 91 sets the priority video data 263 based on the output video data 262. At this time, the controller 91 sets the output video data 262 and the priority video data 263 based on a predetermined set value, setting information that was previously used, or instructions from a user. In step S27, the controller 91 controls each unit to execute a video data caching process on the set priority video data 263. The video data caching process will be described below.

After completing step S27 and caching the priority video data 263 in the SDRAM 92, the controller 91 controls the SDRAM interface 101 to supply the output video data 262 to the display unit 44 and to display it on the monitor unit 112. After displaying the output video data 262, the controller 91 ends the clip area initialization process.

As described above, by performing the clip area initialization process to initialize the clip area, the user can easily ensure the clip area 182 in the memory area 102 of the SDRAM 92 and set the output video data 262 and the priority video data 263.

Figure 18:
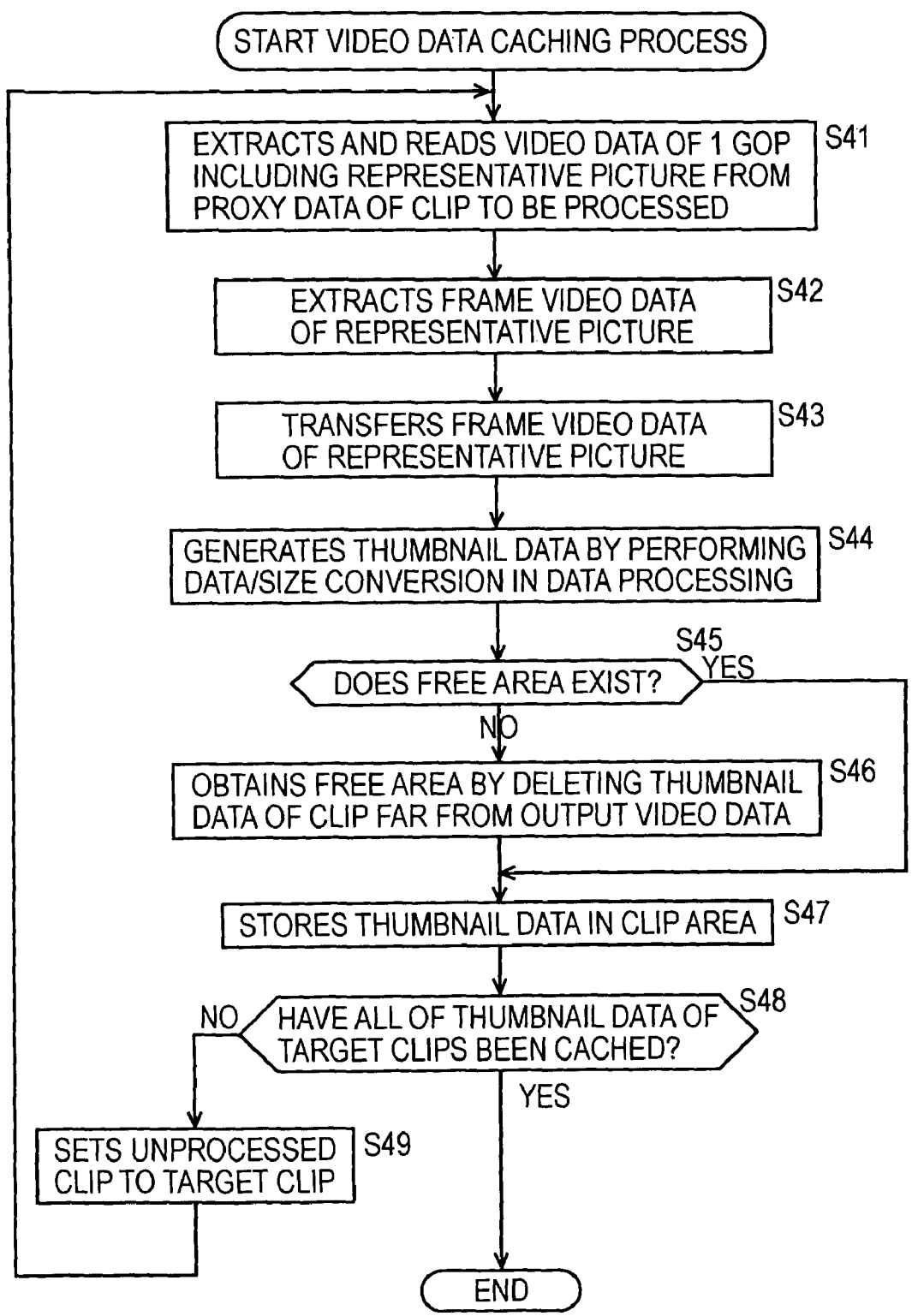
FIG. 18 is a flowchart illustrating an example of a video data caching process.

Next, the video data caching process is described with reference to the flowchart shown in FIG. 18. The video data caching process is executed when new thumbnail data created by the editor 31 is cached in the SDRAM 92. For example, in step S27 of the clip area initialization process shown in FIG. 17, the video data caching process is executed on the priority video data.

After the video data caching process starts, the drive 52 extracts and reads the video data 242 of 1 GOP including a representative picture from the proxy data 241 of a clip to be processed, and supplies the video data 242 to the buffer memory 53, which is allowed to hold the video data 242, under control by the controller 51. As described above, the representative picture is usually a top frame picture.

In step S42, the decoder 54 extracts the frame video data 243 of the representative picture from the video data 242 of 1 GOP under control by the controller 51. In step S43, the buffer memory interface 61 transfers the frame video data 243 of the representative picture to the SDRAM 92 through the PCI bus 81 under control by the controller 51. The SDRAM 92 holds the transferred frame video data 243.

In step S44, the video processing unit 93 processes the frame video data 243 transferred to the SDRAM 92 under control by the controller 91, that is, performs data conversion and size conversion so as to generate the thumbnail data 193.

In step S45, the SDRAM interface 101 determines whether a sufficient free area for holding the generated thumbnail data 193 exists in the clip area 182 under control by the controller 91. When determining that a sufficient free area does not exist, the SDRAM interface 101 obtains an area by deleting thumbnail data of a clip at the end far from the output video data 262 in step S46 under control by the controller 91, as described above with reference to FIG. 15, and in step S47, the SDRAM interface 101 stores the generated thumbnail data 193 in the clip area 182.

When determining in step S45 that a sufficient free area exists, the SDRAM interface 101 skips step S46 to jump to step S47, so as to store the generated thumbnail data 193 in the clip area 182 under control by the controller 91.

After storing the thumbnail data 193, the controller 91 determines whether all of the thumbnail data corresponding to target clips have been cached in step S48. When determining that not all of the thumbnail data have been cached, the process proceeds to step S49, where the controller 91 sets an unprocessed clip to a target clip, retunes to step S41, and repeats the subsequent steps for the target clip.

After repeating the steps, when determining in step S48 that all of the thumbnail data of the target clips have been cached, the controller 91 ends the video data caching process.

As described above, by executing the video data caching process in each unit, the editor 31 can generate the thumbnail data 193 based on the clips 171 recorded on the optical disc 71 and store the thumbnail data 193 in the SDRAM 92, which has a higher access speed than that of the optical disc 71. Accordingly, the editor 31 can display thumbnails on the display at high speed, and thus the user can easily select a desired portion of video data from among a plurality of portions of video data.

Figure 19:
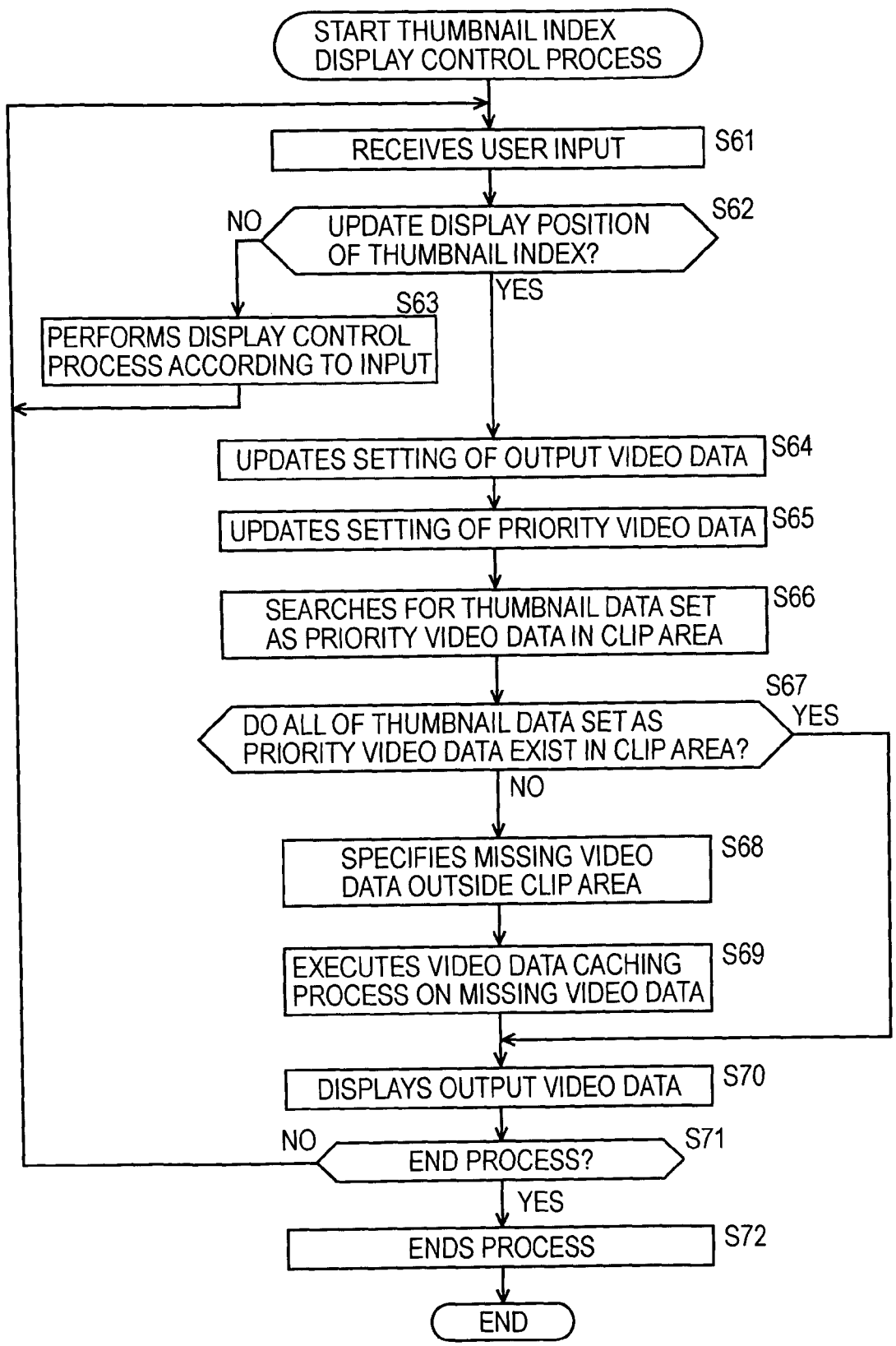
FIG. 19 is a flowchart illustrating an example of a thumbnail index display control process.

Next, a thumbnail index display control process is described with reference to the flowchart shown in FIG. 19.

The controller 91 executes the thumbnail index display control process by controlling each unit and displays thumbnails of the thumbnail data 193 generated in the above-describe manner on the monitor unit 112 in a form of a thumbnail index.

After the thumbnail index display control process starts, the controller 91 receives a user input by controlling the input unit 43 in step S61. Then, in step S62, the controller 91 determines whether a display position of a thumbnail index should be updated based on the user input. As described above with reference to FIG. 14, when it is determined that the display position of the thumbnail index should not be updated, for example, when the position specified by the cursor 271 moves within the output video data 262, the process proceeds to step S63, where the OSD processing unit 11 and the monitor unit 112 in the display unit 44 perform a display control process according to the input. Then, the process returns to step S61 so as to repeat the subsequent steps.

When it is determined in step S62 that the display position of the thumbnail index should be updated in response to a change of the position specified by the cursor 271 based on the user input, the process proceeds to step S64, where the controller 91 updates the setting of the output video data 262, and then updates the setting of the priority video data in step S65.

In step S66, the controller 91 controls the SDRAM interface 101 and searches the clip area 182 for the thumbnail data 193 set as the priority video data 263. Then, in step S67, the controller 91 determines whether all of the thumbnail data 193 set as the priority video data 263 exist in the clip area 182. When determining that not all of the thumbnail data 193 do not exist, the controller 91 proceeds to step S68, so as to specify missing video data outside the clip area. Then, in step S69, the controller 91 controls each unit of the editor 31 to execute the video data caching process (FIG. 18) on the missing video data. After caching all of the video data, the controller 91 proceeds to step S70, so as to supply the output video data 262 to the display unit 44 and to display a thumbnail index by controlling the SDRAM interface 101.

When determining in step S67 that all of the thumbnail data 193 set as the priority video data 263 exist in the clip area 182, the controller 91 skips steps S68 and S69 to jump to step S70, so as to supply the output video data 262 to the display unit 44 and to display a thumbnail index by controlling the SDRAM interface 101.

In step S71, the controller 91 determines whether to end the thumbnail index display control process. When the controller 91 determines not to end the process, the process returns to step S61 so as to repeat the subsequent steps. On the other hand, when the controller 91 determines to end the thumbnail index display control process in step S71, the controller 91 ends the process by ending the display of the thumbnail index in step S72, so as to end the thumbnail index display control process.

By performing the thumbnail index display control process in the above-described manner, the controller 91 can control display of a thumbnail index based on the instructions from a user and sets the priority video data 263 to cache it in the SDRAM 92. This enables the editor 31 to display thumbnails desired by the user on the display at high speed. As a result, the user can easily select a desired portion of video data from among a plurality of portions of video data.

Next, a process performed when information about clips recorded on the optical disc 71 has been updated is described.

Figure 20:
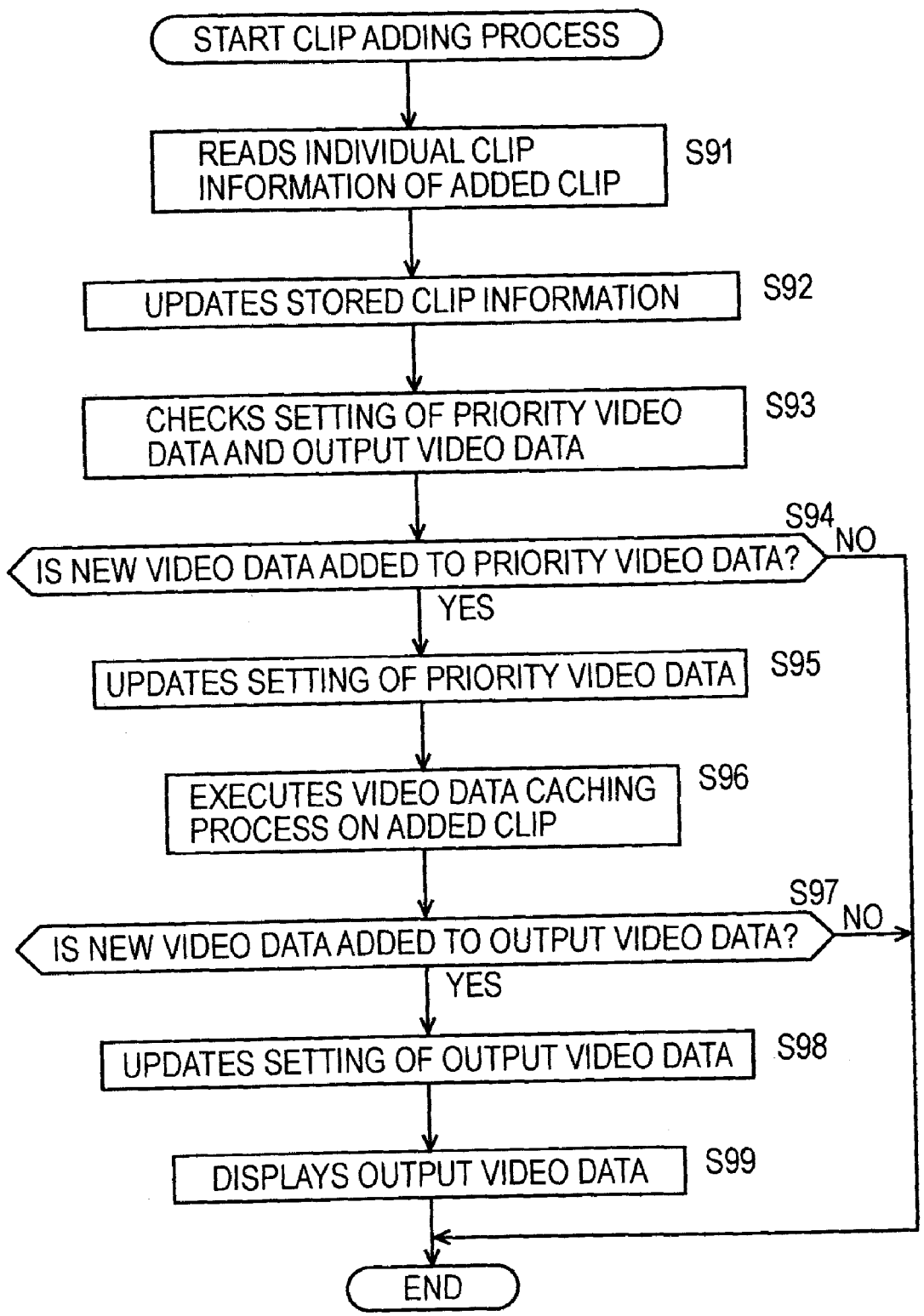
FIG. 20 is a flowchart illustrating an example of a clip adding process.

First, a process performed when a clip is added to the optical disc 71 is described. When a new clip 171 has been added to the optical disc 71, the editor 31 needs to update the clip information 191, which is held in the thumbnail data cache area 181 in the SDRAM 92 as shown in FIG. 9. In other words, information about the added clip 171 needs to be added to the clip information 191. Further, when the added clip 171 is set as the output video data 262 or the priority video data 263, the editor 31 needs to generate a thumbnail of the added clip 171. Therefore, the controller 91 executes a clip adding process after a new clip 171 is added to the optical disc 71. Hereinafter, the clip adding process is described with reference to the flowchart shown in FIG. 20.

First, in step S91, the controller 51 controls the drive 52, reads the individual clip information 201 of the added clip 171 from the optical disc 71, and supplies it to the SDRAM 92 through the buffer memory 53 under control by the controller 91. In step S92, the SDRAM interface 101 of the SDRAM 92, which has been provided with the individual clip information 201, adds the individual clip information 201 to the clip information 191 held in the thumbnail data cache area 181 so as to update the clip information 191.

In step S93, the controller 91 checks the setting of the priority video data 263 and the output video data 262. Then, in step S94, the controller 91 determines whether new video data is added to the priority video data 263 in accordance with the addition of the clip 171. When the controller 91 determines that new video data is added, the process proceeds to step S95.

The controller 91 updates the setting of the priority video data 263 in step S95, and then executes the video data caching process on the added clip 171 in step S96 so as to cache the thumbnail data 193 of the added clip 171 in the SDRAM 92.

In step S97, the controller 91 determines whether new video data is added to the output video data 262 in accordance with the addition of the clip 171. When the controller 91 determines that new video data is added to the output video data 262, the process proceeds to step S98.

In step S98, the controller 91 updates the setting of the output video data 262. In step S99, the controller 91 controls the SDRAM interface 101 to supply the updated output video data 262 to the display unit 44 and to display a thumbnail index corresponding to the output video data 262.

After step S99, the controller 91 ends the clip adding process. When the controller 91 determines in step S94 that no video data is added to the priority video data 263 in accordance with the addition of the clip 171, the controller ends the clip adding process. Also, the controller 91 ends the clip adding process when determining in step S97 that no video data is added to the output video data 262 in accordance with the addition of the clip 171.

By executing the clip adding process in each unit, various information is correctly updated. Therefore, the editor 31 can normally execute various processes including the thumbnail index display control process, the video data caching process, and the clip area initialization process, even when a new clip is added to the optical disc 71.

Figure 21:
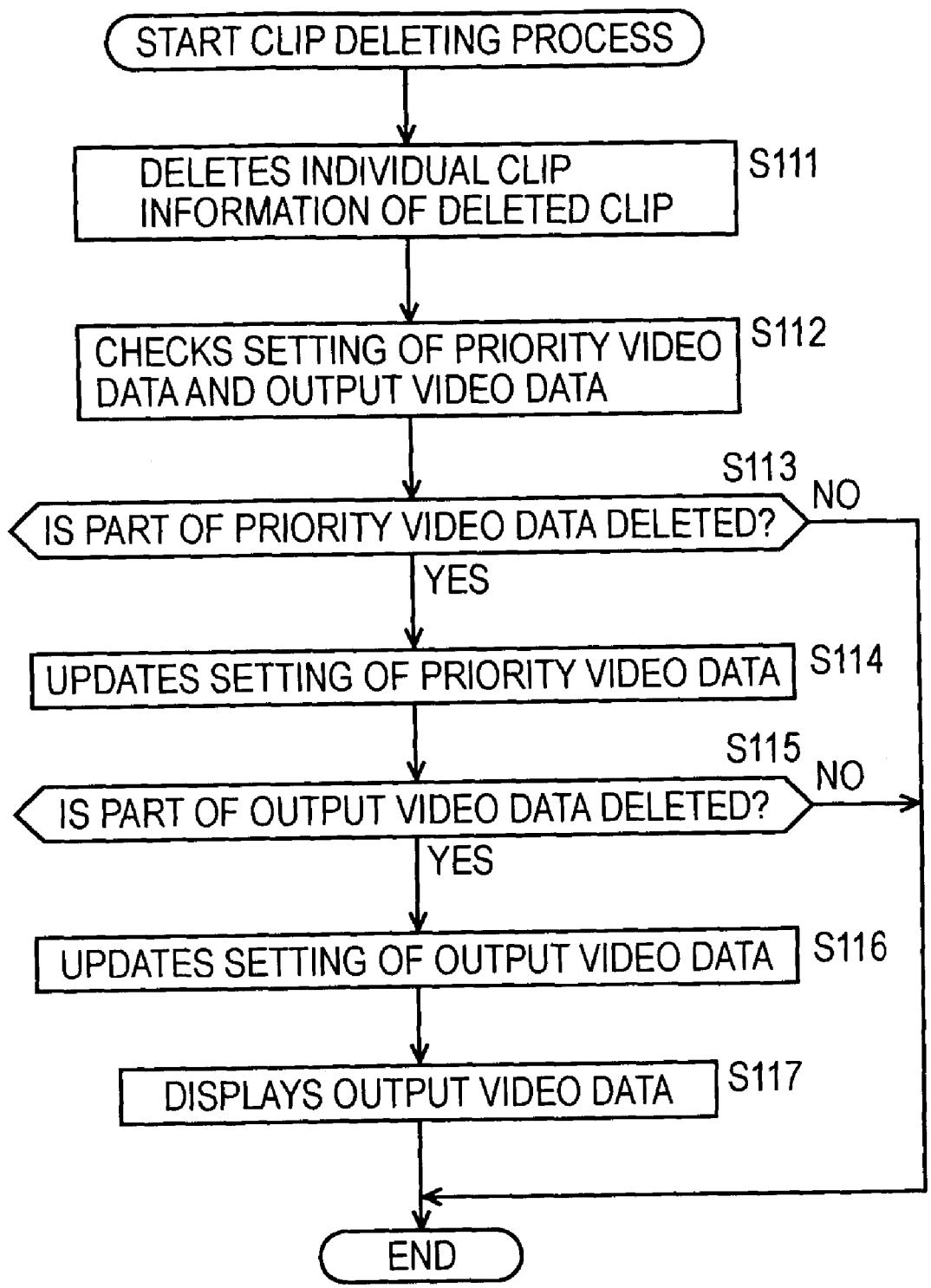
FIG. 21 is a flowchart illustrating an example of a clip deleting process.

Next, a process performed to delete a clip 171 recorded on the optical disc 71 is described. After a clip 171 recorded on the optical disc 71 has been deleted, the editor 31 needs to update the clip information 191 held in the thumbnail data cache area 181 in the SDRAM 92 so as to delete information about the deleted clip 171 from the clip information 191 as shown in FIG. 9. Further, if the deleted clip 171 is set as the output video data 262 or the priority video data 263, the setting thereof needs to be updated. However, the editor 31 is configured to be capable of deleting only the clip 171 of the last clip number among all of the clips 171 recorded on the optical disc 71. Therefore, after the clip 171 has been deleted from the optical disc 71, the controller 91 of the editor 31 executes a clip deleting process shown in the flowchart of FIG. 21.

Specifically, in step S111, the SDRAM interface 101 deletes the individual clip information 201 corresponding to the deleted clip 171 from the clip information 191 held in the SDRAM 92 under control by the controller 91. That is, when the clip is deleted, the SDRAM interface 101 deletes only the individual clip information 201 corresponding to the deleted clip 171 without updating the entire clip information 191. In this case, the SDRAM interface 101 does not update the individual clip information 201 corresponding to the other clips 171.

In step S112, the controller 91 determines whether the deleted clip 171 is included in the priority video data 263 or the output video data 262. In step S113, the controller 91 determines whether part of the priority video data 263 is deleted in accordance with the deletion of the clip 171. When the controller 91 determines that part of the priority video data 263 is deleted, the process proceeds to step S114, where the controller 91 updates the setting of the priority video data 263. After updating the setting of the priority video data 263, the process proceeds to step S115, where the controller 91 determines whether part of the output video data 262 is deleted in accordance with the deletion of the clip 171. When the controller 91 determines that part of the output video data 262 is deleted, the process proceeds to step S116, where the controller 91 updates the setting of the output video data 262 based on the deletion. Then, in step S117, the controller 91 supplies the output video data 262 to the display unit 44 so as to display an index of thumbnails on the monitor unit 112. After displaying the output video data, the controller 91 ends the clip deleting process.

On the other hand, when it is determined in step S113 that no video data is deleted from the priority video data 263 due to the deletion of the clip or when it is determined in step S1115 that no video data is deleted from the output video data 262 due to the deletion of the clip, the controller 91 ends the clip deleting process.

By executing the clip deleting process in each unit, various information is correctly updated. Therefore, the editor 31 can normally execute various processes including the thumbnail index display control process, the video data caching process, and the clip area initialization process, even when a clip 171 is deleted from the optical disc 71.

Figure 22:
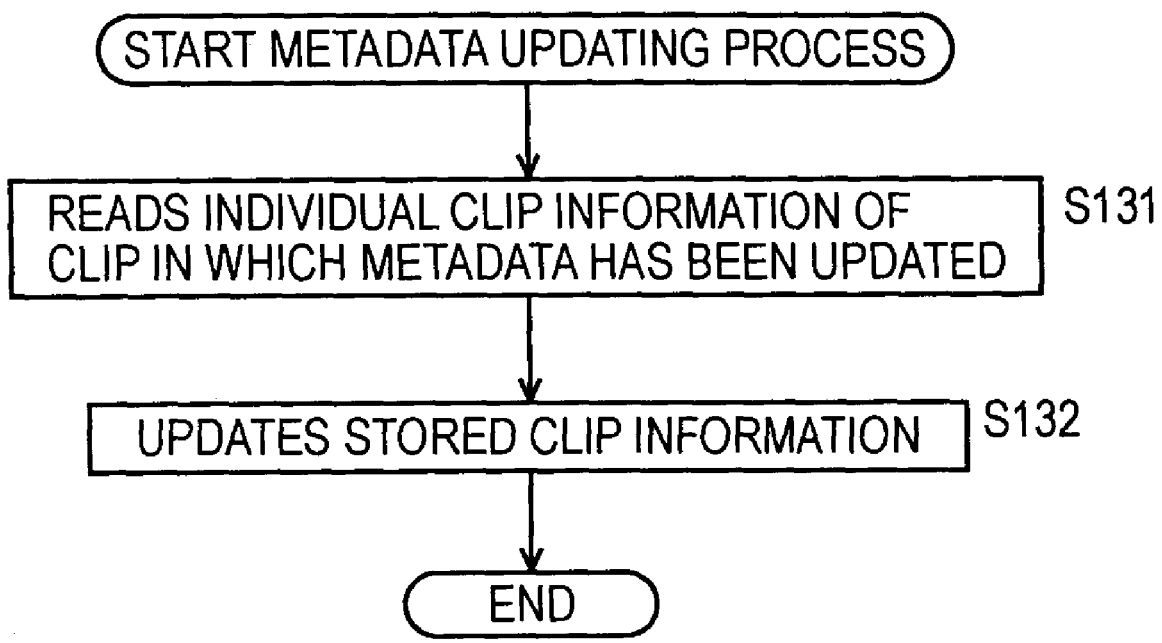
FIG. 22 is a flowchart illustrating an example of a metadata updating process.

Next, a process performed when metadata of a clip 171 recorded on the optical disc 71 is updated is described. After metadata of a clip 171 recorded on the optical disc 71 has been updated, the editor 31 needs to update the clip information 191 held in the thumbnail data cache area 181 in the SDRAM 92 as shown in FIG. 9. Therefore, after metadata of a clip 171 recorded on the optical disc 71 has been updated, the controller 91 of the editor 31 executes a metadata updating process. Hereinafter, the metadata updating process is described with reference to the flowchart shown in FIG. 22.

After the metadata updating process starts, in step S131, the drive 52 reads individual clip information corresponding to the clip 171 in which the metadata has been updated, that is, information of the clip number 211 and the metadata 213, from the optical disc 71 under control by the controller 51. Then, in step S132, the controller 91 updates the clip information held in the SDRAM 92 by using the read individual clip information 201, and then ends the metadata updating process.

By executing the metadata updating process in each unit, various information is correctly updated. Therefore, the editor 31 can normally execute various processes including the thumbnail index display control process, the video data caching process, and the clip area initialization process, even when metadata of a clip 171 stored on the optical disc 71 is updated.

Next, a process performed on a sub-clip is described.

Figure 23:
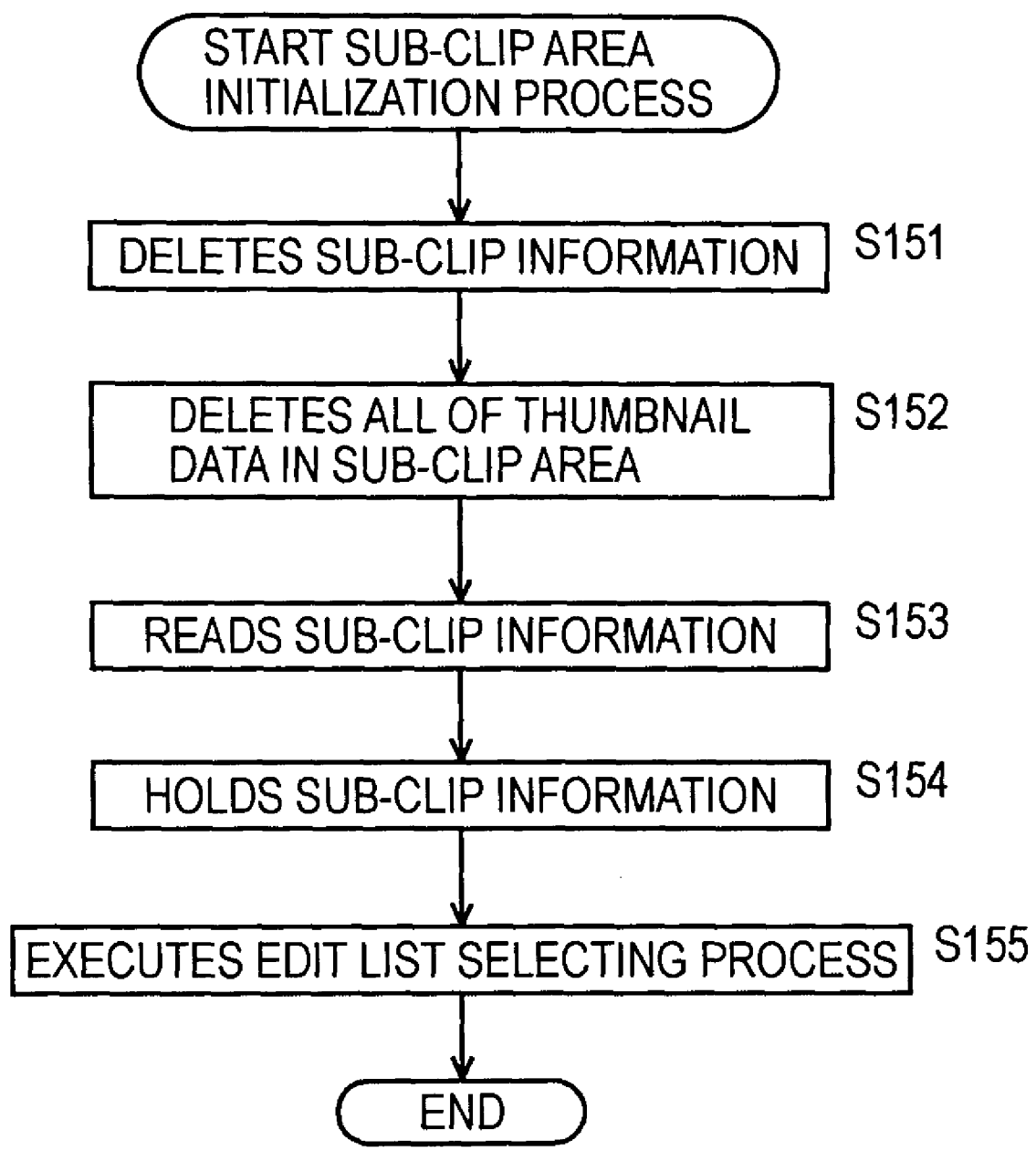
FIG. 23 is a flowchart illustrating an example of a sub-clip area initialization process.

First, a sub-clip area initialization process is described with reference to the flowchart shown in FIG. 23. The controller 91 executes the sub-clip area initialization process by controlling the SDRAM interface 101 when the power of the editor 31 is turned on, when the optical disc 71 is loaded to the drive 52, or when a user provides instructions to execute the initialization process of the sub-clip area 183 in the SDRAM 92.

After the sub-clip area initialization process starts, in step S151, the SDRAM interface 101 deletes the sub-clip information 192 held in the thumbnail data cache area 181 of the memory area 102 under control by the controller 91. In step S152, The SDRAM interface 101 deletes all of the thumbnail data 194 in the sub-clip area 183 under control by the controller 91. In step S153, the controller 91 controls the controller 51 to read the sub-clip information 192 from the optical disc 71. The controller 51 controls each unit of the storage unit 41, reads the sub-clip information 192 from the optical disc 71, and supplies it to the SDRAM 92 of the holding unit 42. Then, in step S154, the SDRAM interface 101 obtains the sub-clip information 192 and stored it in the memory area 102 under control by the controller 91.

In step S155, the controller 91 executes an edit list selecting process based on the updated sub-clip information 192. The edit list selecting process will be described below. After step S155, the controller 91 ends the sub-clip area initialization process.

By executing the sub-clip area initialization process to initialize the sub-clip area 183, the user can easily obtain the sub-clip area 183 in the memory area 102 of the SDRAM 92.

Figure 24:
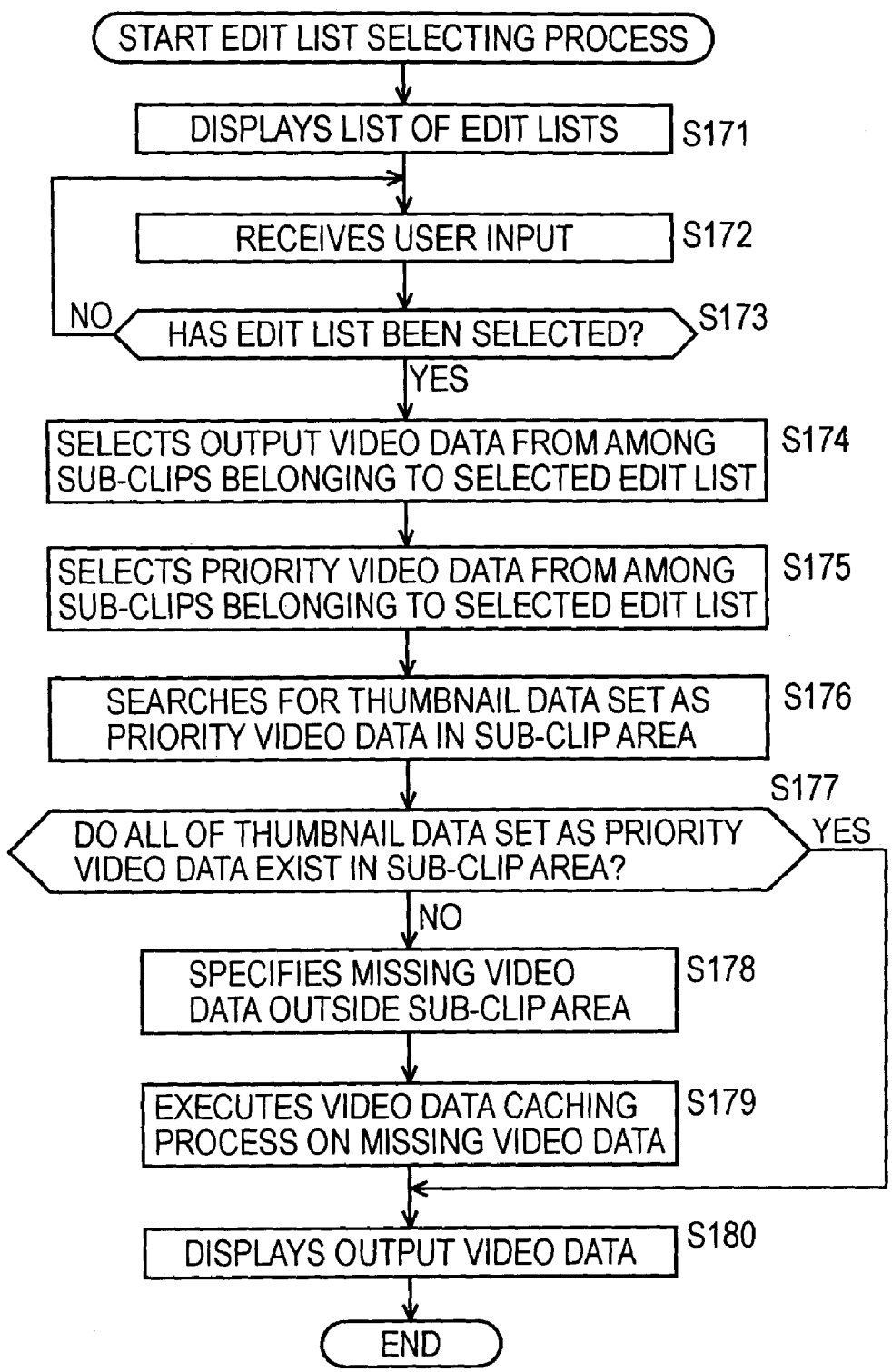
FIG. 24 is a flowchart illustrating an example of an edit list selecting process.

Next, the edit list selecting process is described with reference to the flowchart shown in FIG. 24. The edit list selecting process is executed when the editor 31 selects an edit list 172 corresponding to thumbnails to be displayed on the display unit 44. For example, the edit list selecting process is executed in step S155 in the sub-clip area initialization process shown in FIG. 23.

After the edit list selecting process starts, in step S171, the controller 91 allows the monitor unit 112 to display a list of edit lists 172 based on the individual edit list information 221 of the sub-clip information 192. In step S172, the controller 91 controls the input 43 to receive a user input. In step S173, the controller 91 determines whether an edit list has been selected based on the user input. When the controller 91 determines that no edit list 172 has been selected, the process returns to step S172, where the controller 91 repeats the subsequent steps.

When the controller 91 determines in step S173 that an edit list 172 has been selected, the process proceeds to step S174, where the controller 91 selects output video data from among the sub-clips 173 belonging to the selected edit list. Then, in step S175, the controller 91 selects the priority video data 263 from among the sub-clips 173 belonging to the selected edit list 172.

In step S176, the controller 91 searches for the thumbnail data 194 set as the priority video data 263 in the sub-clip area 183. In step S177, the controller 91 determines whether all of the thumbnail data 194 set as the priority video data 263 exist in the sub-clip area 183.

When the controller 91 determines that not all of the thumbnail data 194 set as the priority video data 263 do not exist in the sub-clip area 183, the process proceeds to step S178, where the controller 91 specifies missing video data outside the sub-clip area 183. Then, in step S179, the controller 91 executes the video data caching process that has been described above with reference to the flowchart shown in FIG. 18 on the specified missing video data. In this case, however, the generated thumbnail data 194 is held in the sub-clip area 183.

After step S179, the process proceeds to step S180, where the controller 91 supplies the output video data 262 to the display unit 44 and allows the monitor unit 112 to display a thumbnail index corresponding to the output video data 262, so as to end the edit list selecting process.

On the other hand, when the controller 91 determines in step S177 that all of the thumbnail data 194 set as the priority data 263 exist in the sub-clip area 183, the controller 91 skips steps S178 and S179 to jump to step S180 because no video data is missing. Then, the controller 91 supplies the output video data 262 to the display unit 44 and allows the monitor unit 112 to display a thumbnail index corresponding to the output video data 262, so as to end the edit list selecting process.

As described above, since the controller 91 of the editor 31 accepts a selection of an edit list 172 to display a list of sub-clips, the editor 31 can display a list of the sub-clips 173 belonging to any edit list 172 desired by the user.

A display control process for the sub-clip list displayed in the above-described manner is the same as in the case of the clip list described with reference to the flowchart shown in FIG. 19, and thus the corresponding description is omitted.

Figure 25:
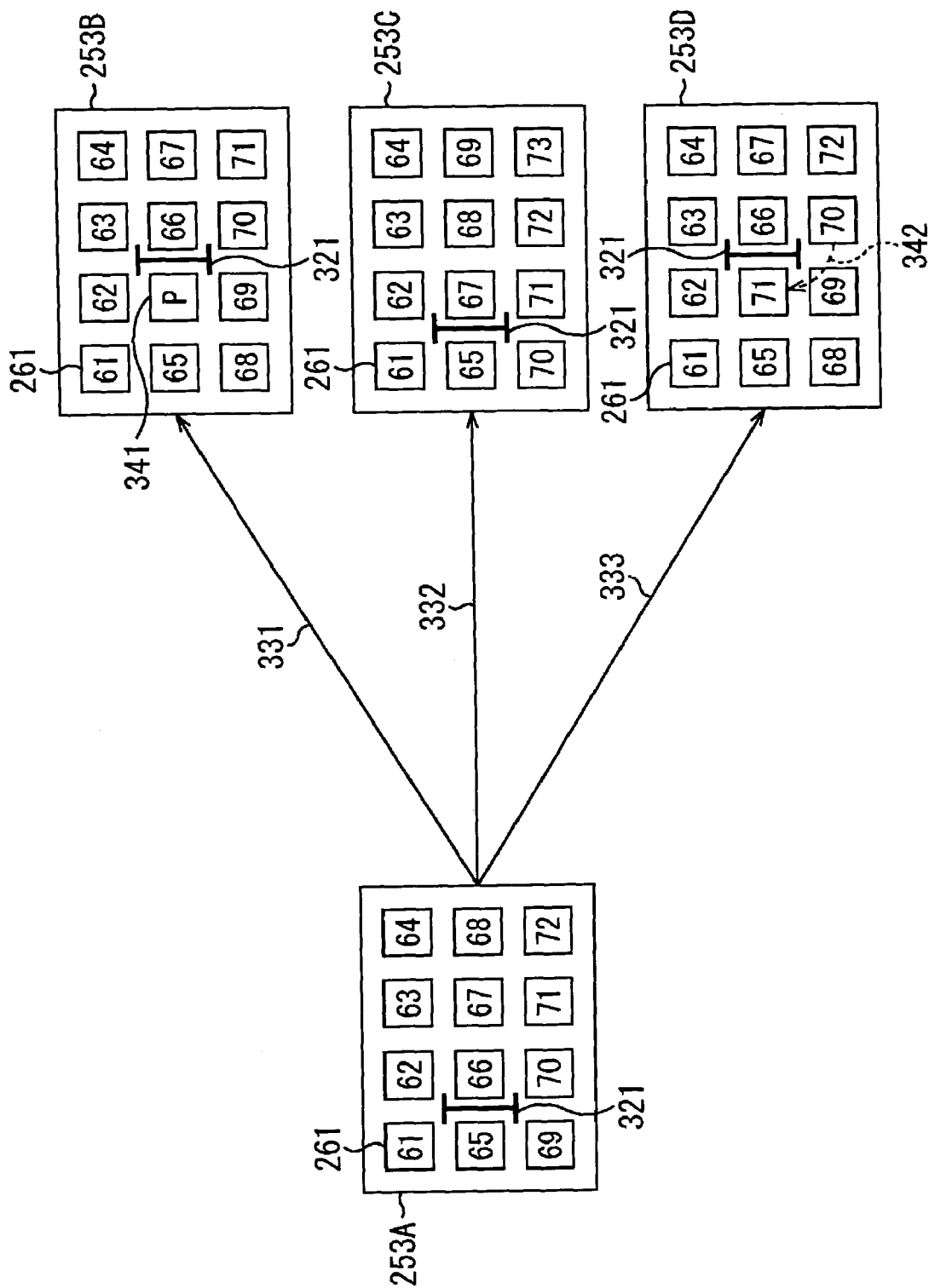
FIG. 25 is a schematic view illustrating a procedure of updating sub-clips.

Next, editing of an edit list using thumbnails of sub-clips is described. As shown in FIG. 25, the editor 31 performs an editing process of sub-clips, for example, insertion of a new sub-clip (arrow 331), deletion of an existing sub-clip (arrow 332), or change of the order of sub-clips (arrow 333).

As shown in FIG. 25, when such an editing process starts, a cursor displayed in the thumbnail index display section 253A before change changes to a cursor 321 of an "I" shape.

As indicated by the arrow 331, when a thumbnail 341 of a clip of a clip number "P" is inserted to the position of the cursor 321, the thumbnail index is edited in the manner shown in a thumbnail index display section 253B. That is, the inserted thumbnail 341 of the clip of the clip number "P" is displayed between the thumbnail 261 of a clip of a clip number 65 and the thumbnail 261 of a clip of a clip number 66, so that the display position of the respective thumbnails 261 of the clips of clip numbers 66 and thereafter shifts backward by one.

As indicated by the arrow 332, when the thumbnail 261 of the clip of a clip number 66 at the cursor 321 is deleted, the thumbnail index is edited in the manner shown in a thumbnail index display section 253C. That is, after the thumbnail 261 of the clip of the clip number 66 has been deleted, the display position of the respective thumbnails 261 of the clips of clip numbers 67 and thereafter shifts forward by one.

As indicated by the arrow 333, when the display position (order) of thumbnails 261 is changed, the thumbnail index is edited in the manner shown in a thumbnail index display section 253D. That is, after the thumbnail 261 of the clip of a clip number 71 moves to the position of the thumbnail 261 of the clip of a clip number 66, the display position of the respective thumbnails 261 of the clips of clip numbers 66 to 70 shifts backward by one. The display position of the thumbnail 261 of the clip of a clip number 72 does not change.

As described above, in the sub-clips 173, a clip in a middle of the order of clip numbers can be updated unlike in the clips 171.

Figure 26:
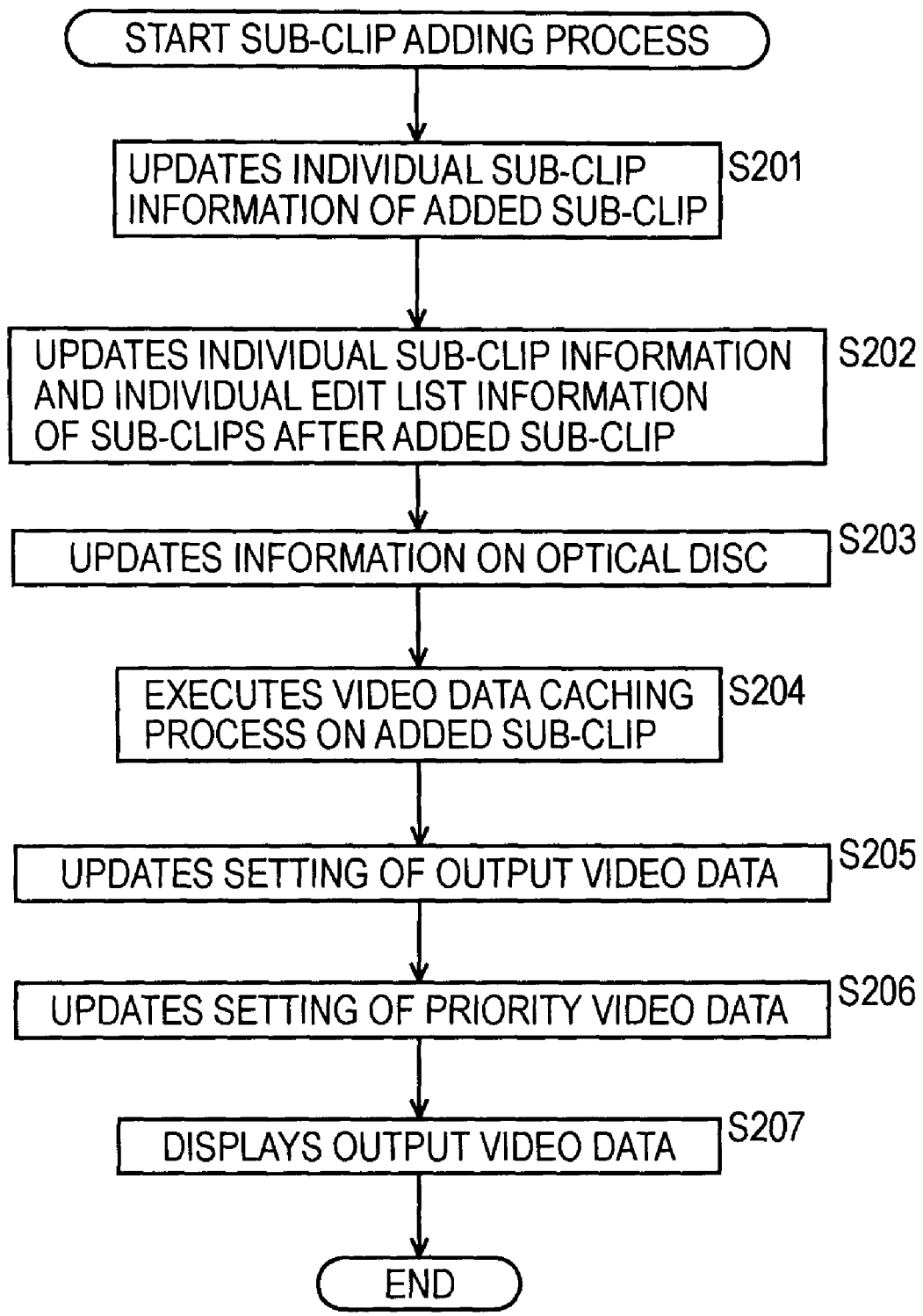
FIG. 26 is a flowchart illustrating an example of a sub-clip adding process.

The editor 31 executes a sub-clip adding process shown in the flowchart of FIG. 26 when a new sub-clip 173 is added to the edit list 172. Hereinafter, the sub-clip adding process is described with reference to the flowchart shown in FIG. 26.

After the sub-clip adding process starts, in step S201, the controller 91 controls the SDRAM interface 101, and adds/updates the individual sub-clip information 222 of the added sub-clip 173, which is included in the sub-clip information 192 held in the thumbnail data cache area 181, based on the addition/update of the sub-clip 173.

Then, in step S202, the controller 91 controls the SDRAM interface 101 to update the individual sub-clip information 222 of the sub-clips 173 after the added sub-clip 173 in order of clip numbers and to update the individual edit list information 221 of the edit list 172 to which the sub-clips 173 belong.

In step S203, the drive 52 updates information in the optical disc 71 and makes the updated information reflected on the information recorded on the optical disc 71 under control by the controller 51. In step S204, the controller 91 executes the video data caching process shown in FIG. 18 on the added sub-clip 173. In this case, however, the thumbnail data 194 is cached in the sub-clip area 183. After the thumbnail data 194 has been cached, the controller 91 updates the setting of the output video data 262 in step S205, updates the setting of the priority video data 263 in step S206, and controls the SDRAM interface 101 to supply the updated output video data 262 to the display unit 44 and to display it on the monitor unit 112 in step S207. After displaying the output video data 262, the controller 91 ends the sub-clip adding process.

Figure 27:
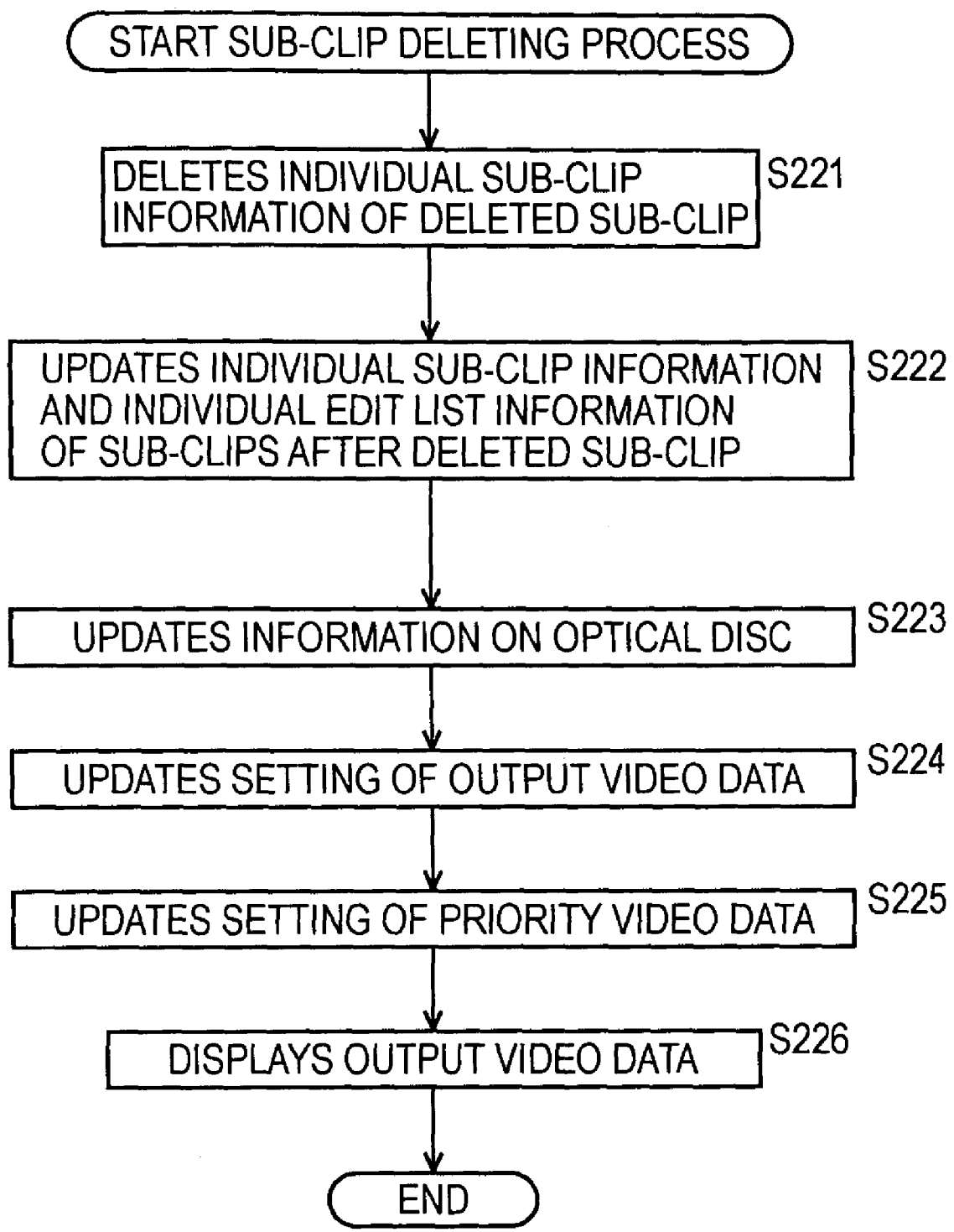
FIG. 27 is a flowchart illustrating an example of a sub-clip deleting process.

Next, a case of deleting a sub-clip 173 is described. When a sub-clip 173 is deleted from the edit list 172, the editor 31 executes a sub-clip deleting process shown in the flowchart of FIG. 27. Hereinafter, the sub-clip deleting process is described with reference to the flowchart shown in FIG. 27.

After the sub-clip deleting process starts, in step S221, the controller 91 deletes the individual sub-clip information 222 of the deleted sub-clip 173. Then, in step S222, the controller 91 updates the individual sub-clip information 222 of the sub-clips 173 after the deleted sub-clip 173 in order of clip number and to update the individual edit list information 221 of the edit list 172 to which the deleted sub-clip 173 belongs.

In step S223, the drive 52 updates information on the optical disc 71 and makes the updated information reflected on the information recorded on the optical disc 71 under control by the controller 51. Then, the controller 91 updates the setting of the output video data 262 in step S224, updates the setting of the priority video data 263 in step S225, and controls the SDRAM 101 to supply the updated output video data 262 to the display unit 44 and to display it on the monitor unit 112 in step S226. After displaying the output video data 262, the controller 91 ends the sub-clip deleting process.

Figure 28:
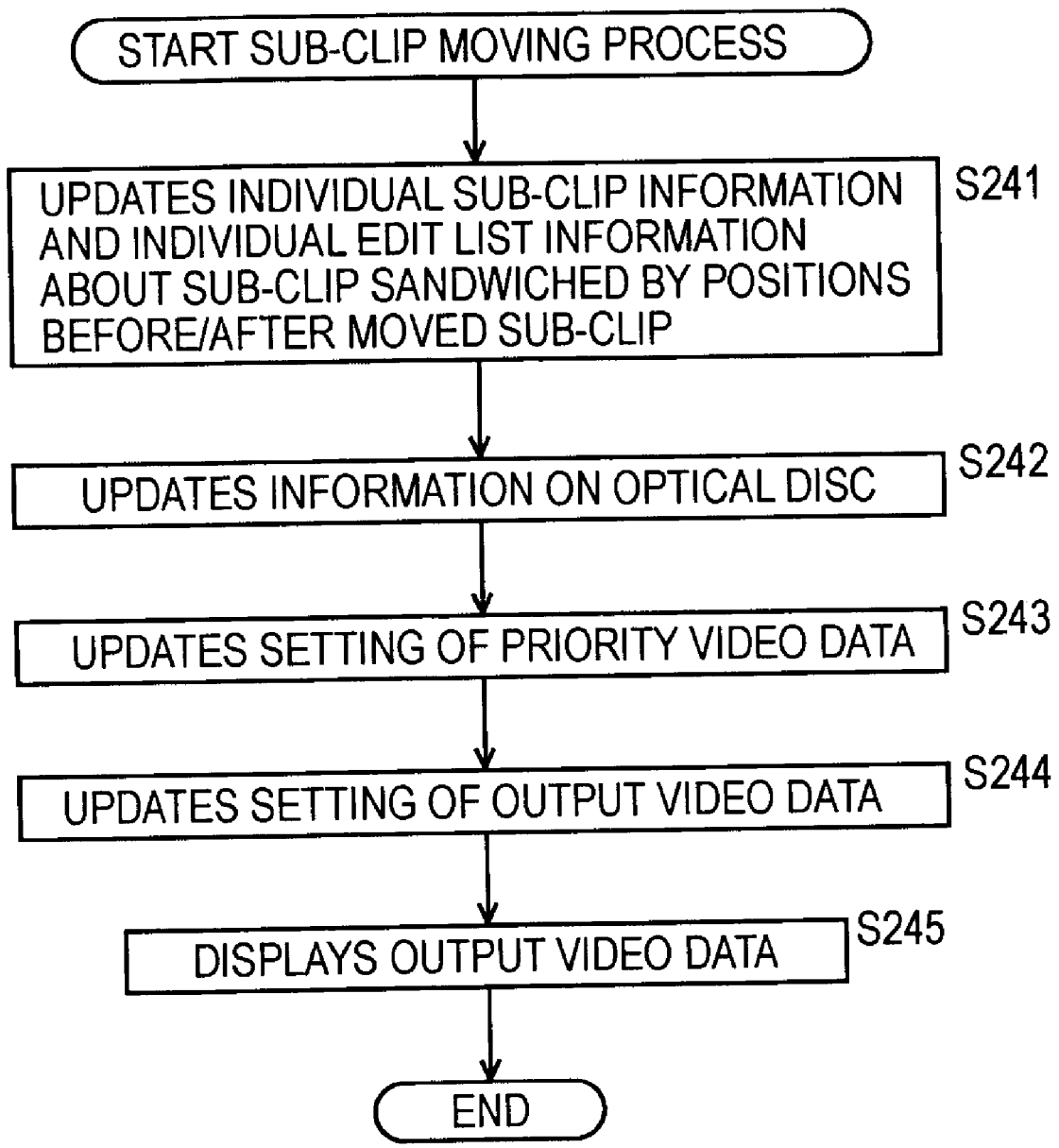
FIG. 28 is a flowchart illustrating an example of a sub-clip moving process; and, FIG. 29 is a block diagram showing an example of a configuration of a personal computer to which the present invention is applied.

Next, a case of changing the position (order) of sub-clips 173 is described. In the edit list 172, when the position (order) of sub-clips 173 is changed, the editor 31 executes a sub-clip moving process shown in the flowchart of FIG. 28. Hereinafter, the sub-clip moving process is described with reference to the flowchart shown in FIG. 28.

After the sub-clip moving process starts, in step S241, the controller 91 updates the individual sub-clip information 222 and the individual edit list information 221 about the sub-clip 173 sandwiched by positions before and after the moved sub-clip 173.

In step S242, the drive 52 updates information recorded on the optical disc 71 and makes the updated information reflected on the optical disc 71 under control by the controller 51. Then, the controller 91 updates the setting of the priority video data 263 in step S243, and updates the setting of the output video data 262 in step S244. Further, in step S245, the drive 52 controls the SDRAM interface 101 to supply the updated output video data 262 to the display unit 44 and to display it on the monitor unit 112. After displaying the output video data 262, the controller 91 ends the sub-clip moving process.

In this way, since the updating process is performed on the sub-clips 173, the editor 31 can display a list of the sub-clips 173 belonging to any edit list 172 desired by the user.

As described above, the editor 31 generates thumbnail data of the clips 171 or the sub-clips 173 recorded on the optical disc 71, stored the thumbnail data in the SDRAM 92, which has a higher access speed and shorter data reading time than those of the optical disc 71, and displays corresponding thumbnails 261 on the display unit 44. That is, the editor 31 supplies video data to the display unit 44 not from the optical disc 71 but from the SDRAM 92 having a higher access speed.

By performing control in the above-described manner, the editor 31 can shorten response time from when video data to be supplied to the display unit 44 is specified until when a picture of the video data is displayed on the display unit 44. Accordingly, a user of the editor 31 can display a thumbnail index at a sufficiently quick response speed (without waiting) after he/she inputs instructions. As a result, the user can easily select a desired portion of video data from among a plurality of portions of video data without feeling stress.

At this time, the editor 31 preferentially caches thumbnail data having a high possibility of being supplied next to the display unit 44 (e.g., data for each two screens before and after the output video data) in the SDRAM 92. That is, the number of thumbnails of data held in the SDRAM 92 is greater than the number output to the display unit 44 and is less than the number that can be held in the SDRAM 92.

In this method, the editor 31 can increase the possibility that the SDRAM 92 holds new video data to be supplied to the display unit 44 when the thumbnail data supplied to the display unit 44 is changed. In other words, since thumbnail data that is not likely to be output is not held in the SDARM 92, the editor 31 can suppress an increase in loads due to an increase in wasteful processes. This further increases the above-described response speed. Further, the memory area 102 in the SDRAM 92 can be efficiently used.

Further, since the editor 31 allows the SDRAM 92 to hold generated thumbnail data, a thumbnail data generating process need not be performed when transferring the thumbnail data from the SDRAM 92 to the display unit 44. That is, since thumbnail data having a high possibility of being supplied to the display unit 44 is generated in advance with an appropriate timing, data conversion and the like can be omitted. This further increases the above-described response speed.

The above-mentioned specific values used as an example: the number of thumbnails 261 displayed at one time (the number of thumbnails of data included in the output video data 262); the number of thumbnails of data included in the priority video data 263; the picture size; and the maximum number of thumbnails of data, may be other values.

In the above description, the editor 31 displays a thumbnail index on the monitor unit 112. However, any picture may be displayed on the monitor unit 112 as long as the picture is generated by using the data recorded on the optical disc 71. Further, part or all of the storage unit 41, the holding unit 42, the input unit 43, and the display unit 44 may be configured separately.

By providing two areas: the clip area 182 and the sub-clip area 183 in the SDRAM 92, the thumbnail data 193 corresponding to the clips 171 and the thumbnail data 194 corresponding to the sub-clips 173 can be managed in different areas.

The above-described series of processes can be executed by either of hardware and software. In this case, for example, the video data playback control apparatus 1 shown in FIG. 1 or the editor 31 shown in FIG. 4 may be configured as a personal computer shown in FIG. 29. The description of standard PC features, such as local volatile and/or non-volatile memory, I/O capabilities, common peripheral devices, as well as hardware component functionality have been omitted for brevity, the detailed operation/description of which is well known to those skilled in the art.

When the above-described series of processes are executed by software in a PC, a program constituting the software is installed from a network or a recording medium. The description of standard PC features, such as local volatile and/or non-volatile memory, I/O capabilities, common peripheral devices, as well as hardware component functionality have been omitted for brevity, the detailed operation/description of which is well known to those skilled in the art.

Figure 29:
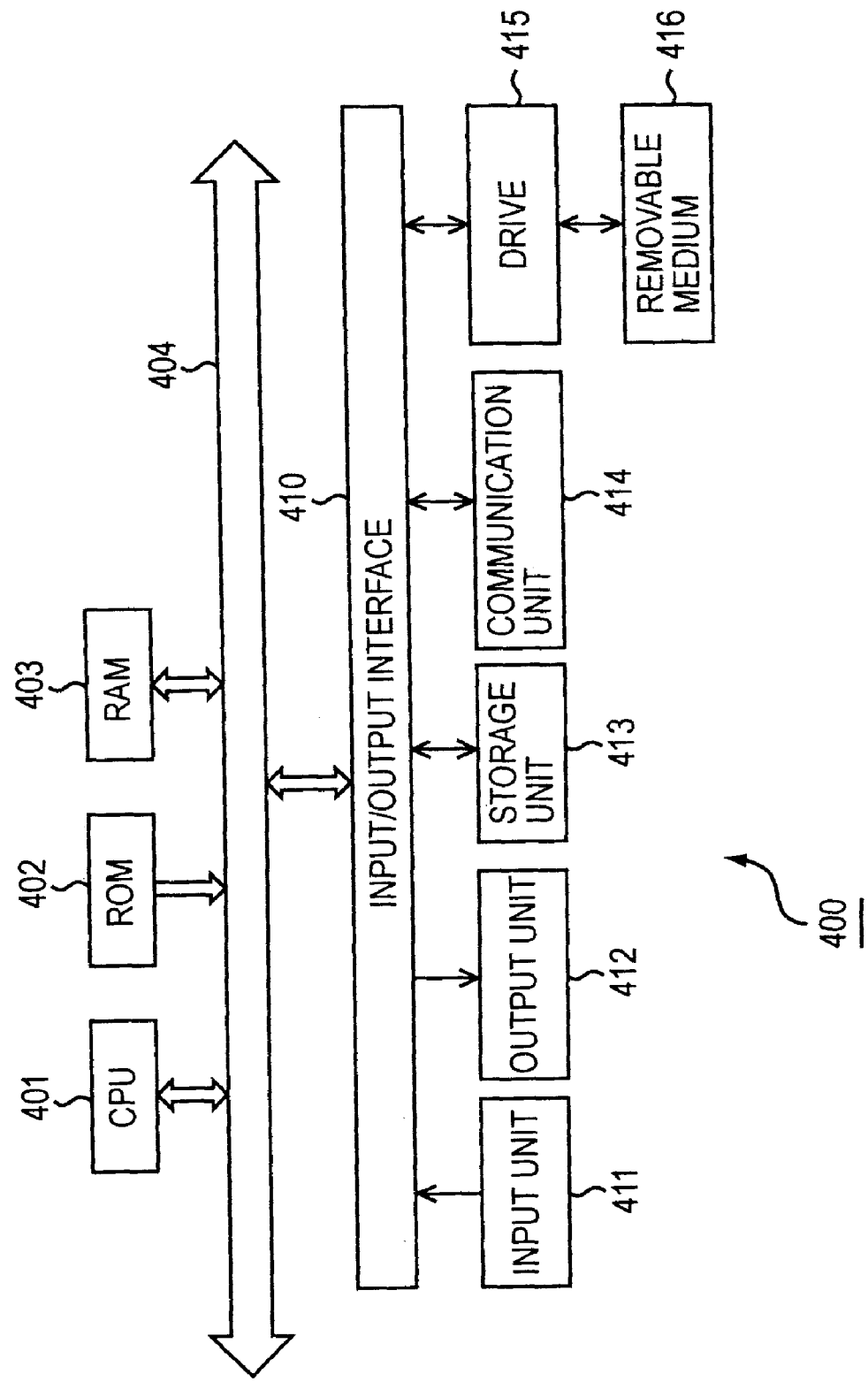

The recording medium may be the removable medium 416 shown in FIG. 29 separated from the apparatus body and distributed to provide users with a program, e.g., a magnetic disk (including a flexible disk); an optical disc (including a CD-ROM (compact disc-read only memory) and a DVD (digital versatile disc)); a magneto-optical disk (including MD (Mini Disk®)); or a semiconductor memory, or may be a hard disk included in the ROM 402 or the storage unit 413, which is distributed to users while being incorporated into the apparatus body in advance and which contains a program.

This Application claims priority to Japanese Application No. P2004-243553, the entirety of which is incorporated herein by reference.

Obviously, readily discernible modifications and variations of the present invention are possible in light of the above teachings. It is therefore to be understood that within the scope of the appended claims, the invention may be practiced otherwise than as specifically described herein. For example, while described in terms of both software and hardware components interactively cooperating, it is contemplated that the system described herein may be practiced entirely in software. The software may be embodied in a carrier such as magnetic or optical disk, or a radio frequency or audio frequency carrier wave.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

What is claimed is:

1. An information processing apparatus for processing video data, comprising:
   video data memory that includes a dedicated thumbnail data cache area, the thumbnail data cache area including a dedicated clip area that is configured to store clip thumbnail data and a dedicated sub-clip area that is configured to store sub-clip thumbnail data, the clip area and the sub-clip area being separate areas within the thumbnail data cache area that are respectively configured such that the clip area does not cache sub-clip thumbnail data and the sub-clip area does not cache clip thumbnail data; and
   a controller configured to control the video data memory to preferentially cache a predetermined range of the video data as priority video data in the clip area, the priority video data including video data currently output from the video data memory to a display device and, video data, which is sequentially related to the currently output video data in the sub-clip area, and which is priority video data corresponding to an edit list having a greater number of reference marker image video data than that of the output video data,
   wherein, the predetermined range of the video data that is preferentially cached in the clip area as priority video data changes depending on the video data currently output from the video data memory to the display device, the predetermined range of the video data including the video data currently output from the video data memory to the display device, a first predetermined range of sequential video data that immediately precedes the video data currently output from the video data memory to the display device in a management order of the video data, and a second predetermined range of sequential video data that immediately follows the video data currently output from the video data memory to the display device in the management order of the video data.

2. The information processing apparatus according to claim 1, wherein the number of thumbnails of priority video data is an integral multiple of the number of portions of the video data currently output from the video data memory to the display device.

3. The information processing apparatus according to claim 1, wherein the number of thumbnails of priority video data is less than a maximum number that can be cached in the video data memory.

4. The information processing apparatus according to claim 1, wherein, in a case where new priority video data is to be cached in the video data memory which holds a maximum number of thumbnails of video data, the controller controls the video data memory to delete video data furthest from the video data currently output from the video data memory to the display device in managing order of the video data from among the video data cached in the video data memory, whereby the new priority video data is cached in the video data memory.

5. The information processing apparatus according to claim 1, further comprising:
   a reproduction unit configured to read the video data from a recording medium;
   the display device configured to display the video data currently output from the video data memory to the display device;
   an interface unit configured to receive instructions of changing the contents of the display;
   wherein the controller sets the video data currently output from the video data memory to the display device and the priority video data based on the instructions received by the interface; and determines whether the priority video data set includes missing video data that is not cached in the video data memory, and if the determination is that, priority video data includes missing video data, the controller controls the reproduction unit to read the missing video data from the recording medium and controls the video data memory to cache the read missing video data.

6. The information processing apparatus according to claim 5, wherein, when thumbnails of video data are displayed as an index time by the display device, the controller sets video data of the index as the video data currently output from the video data memory to the display device, and sets the video data currently output from the video data memory to the display device and video data of thumbnails before and after the video data currently output from the video data memory to the display device in managing order of the video data as the priority video data in groupings based upon a size of the index.

7. The information processing apparatus according to claim 5, wherein the reproduction unit reads moving picture data of a low resolution recorded on the recording medium and generates the video data by using the read moving picture data.

8. An information processing method comprising:

caching video data in a memory that includes a dedicated thumbnail data cache area, the thumbnail data cache area including a dedicated clip area that is configured to store clip thumbnail data and a dedicated sub-clip area that is configured to store sub-clip thumbnail data, the clip area and the sub-clip area being separate areas within the thumbnail data cache area that are respectively configured such that sub-clip thumbnail data is not cached in the clip area and clip thumbnail data is not cached in the sub-clip area; and allowing the memory to preferentially cache a predetermined range of the video data as priority video data in the clip area, the priority video data including video data currently output from the memory to a display device, and, video data, which is sequentially related to the video data currently output from the video data memory to the display device in the sub-clip area, and, which is priority video data corresponding to an edit list having a greater number of thumbnails of video data than that of the video data currently output from the video data memory to the display device, by controlling the memory accordingly, wherein, the predetermined range of the video data that is preferentially cached in the clip area as priority video data changes depending on the video data currently output from the video data memory to the display device, the predetermined range of the video data including the video data currently output from the video data memory to the display device, a first predetermined range of sequential video data that immediately precedes the video data currently output from the video data memory to the display device in a management order of the video data, and a second predetermined range of sequential video data that immediately follows the video data currently output from the video data memory to the display device in the management order of the video data.

9. A computer-readable storage medium, including computer program instructions, that cause a computer to implement a method of prioritizing content for playback, comprising:

caching video data in a memory that includes a dedicated thumbnail data cache area, the thumbnail data cache area including a dedicated clip area that is configured to store clip thumbnail data and a dedicated sub-clip area that is configured to store sub-clip thumbnail data, the clip area and the sub-clip area being separate areas within the thumbnail data cache area that are respectively configured such that sub-clip thumbnail data is not cached in the clip area and clip thumbnail data is not cached in the sub-clip area; and allowing the memory to preferentially cache a predetermined range of the video data as priority video data in the clip area, the priority video data including video data currently output from the memory to a display device, and, video data, which is sequentially related to the video data currently output from the video data memory to the display device in the sub-clip area, and, which is priority video data corresponding to an edit list having a greater number of thumbnails of video data than that of the video data currently output from the video data memory to the display device, by controlling the memory accordingly, wherein, the predetermined range of the video data that is preferentially cached in the clip area as priority video data changes depending on the video data currently output from the video data memory to the display device, the predetermined range of the video data including the video data currently output from the video data memory to the display device, a first predetermined range of sequential video data that immediately precedes the video data currently output from the video data memory to the display device in a management order of the video data, and a second predetermined range of sequential video data that immediately follows the video data currently output from the video data memory to the display device in the management order of the video data.

10. An information processing apparatus for processing video data, comprising:

means for caching video data that includes a dedicated thumbnail data cache area, the thumbnail data cache area including a dedicated clip area that is configured to store clip thumbnail data and a dedicated sub-clip area that is configured to store sub-clip thumbnail data, the clip area and the sub-clip area being separate areas within the thumbnail data cache area that are respectively configured such that the clip area does not cache sub-clip thumbnail data and the sub-clip area does not cache clip thumbnail data; and, means for controlling the means for storing data to preferentially hold a predetermined range of the video data as priority video data, the priority video data in the clip area, including video data, currently output from the means for storing and video data to a display device which is sequentially related to the currently output video data in the sub-clip area and which is priority video data corresponding to an edit list having a greater number of thumbnails of video data than that of the video data currently output from the video data memory to the display device, wherein, the predetermined range of the video data that is preferentially cached in the clip area as priority video data changes depending on the video data currently output from the video data memory to the display device, the predetermined range of the video data including the video data currently output from the video data memory to the display device, a first predetermined range of sequential video data that immediately precedes the video data currently output from the video data memory to the display device in a management order of the video data, and a second predetermined range of sequential video data that immediately follows the video data currently output from the video data memory to the display device in the management order of the video data.

* * * * *